(12) United States Patent
Jung

(10) Patent No.: US 11,829,871 B2
(45) Date of Patent: Nov. 28, 2023

(54) VALIDATING PERFORMANCE OF A NEURAL NETWORK TRAINED USING LABELED TRAINING DATA

(71) Applicant: LG ELECTRONICS INC., Seoul (KR)

(72) Inventor: Namsoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 806 days.

(21) Appl. No.: 16/805,584

(22) Filed: Feb. 28, 2020

(65) Prior Publication Data

US 2021/0056411 A1    Feb. 25, 2021

Related U.S. Application Data

(60) Provisional application No. 62/889,059, filed on Aug. 20, 2019.

(51) Int. Cl.
*G06N 3/08* (2023.01)
*G06F 17/18* (2006.01)
(Continued)

(52) U.S. Cl.
CPC ............ *G06N 3/08* (2013.01); *G06F 11/3466* (2013.01); *G06F 17/18* (2013.01); *G06N 3/082* (2013.01); *G06N 20/00* (2019.01)

(58) Field of Classification Search
None
See application file for complete search history.

(56) References Cited

U.S. PATENT DOCUMENTS 11,048,979 B1 *  6/2021  Zhdanov ............. G06V 10/776
2015/0356457 A1   12/2015 Ghosh et al.
(Continued)

FOREIGN PATENT DOCUMENTS

KR    1020170134508    12/2017

OTHER PUBLICATIONS

PCT International Application No. PCT/KR2020/006249, Written Opinion of the International Searching Authority dated Aug. 21, 2020, 9 pages.

*Primary Examiner* — Gregory B Sefcheck
*Assistant Examiner* — Suk Jin Kang
(74) *Attorney, Agent, or Firm* — LEE HONG DEGERMAN KANG WAIMEY

(57) ABSTRACT

A method for validating performance of a neural network trained using labeled training and validation data is provided. The method includes: determining proposed model parameters as potential updates to the neural network using the labeled validation data, performing a short-term validation on the proposed model parameters applied to the neural network based on the labeled validation data by comparing a first performance output based on the proposed model parameters and a second performance output based on currently-existing model parameters applied to the neural network, updating the currently-existing model parameters with the proposed model parameters when the second performance output outperforms the first performance output with respect to the labeled validation data, performing a long-term validation on the updated currently-existing model parameters applied to the neural network, and performing an operation when a difference between the original model parameters and the updated currently-existing model parameters lies within a threshold.

21 Claims, 12 Drawing Sheets

(51) Int. Cl.
    *G06F 11/34*     (2006.01)
    *G06N 20/00*     (2019.01)
    *G06N 3/082*     (2023.01)

(56) References Cited

U.S. PATENT DOCUMENTS

| | | | |
|---|---|---|---|
| 2017/0024641 A1 | 1/2017 | Wierzynski | |
| 2017/0124486 A1 | 5/2017 | Chan et al. | |
| 2018/0018553 A1 | 1/2018 | Bach et al. | |
| 2018/0268298 A1* | 9/2018 | Johansen | G06V 10/764 |
| 2018/0300576 A1 | 10/2018 | Dalyac et al. | |
| 2019/0294995 A1* | 9/2019 | Pastor Perales | G06N 20/00 |
| 2019/0303759 A1* | 10/2019 | Farabet | G06F 9/455 |
| 2019/0370648 A1* | 12/2019 | Zoph | G06N 3/082 |
| 2019/0379589 A1* | 12/2019 | Ryan | G06N 3/084 |
| 2020/0034665 A1* | 1/2020 | Ghanta | G06F 17/18 |
| 2020/0104849 A1* | 4/2020 | Cai | G06F 18/217 |
| 2020/0184374 A1* | 6/2020 | Liu | G06N 20/00 |
| 2020/0210811 A1* | 7/2020 | Koo | G06F 7/023 |
| 2020/0372362 A1* | 11/2020 | Kim | G06N 3/04 |
| 2021/0012862 A1* | 1/2021 | Plumbley | G06N 20/00 |
| 2021/0027116 A1* | 1/2021 | Monaghan | G06K 9/6262 |
| 2021/0027193 A1* | 1/2021 | Monaghan | G06N 20/00 |
| 2021/0075798 A1* | 3/2021 | Krasser | G06N 20/00 |
| 2021/0133510 A1* | 5/2021 | Boulanger | G06N 3/08 |
| 2021/0174231 A1* | 6/2021 | Sawada | G06N 3/08 |
| 2021/0174958 A1* | 6/2021 | Drake | G16H 50/70 |
| 2021/0210205 A1* | 7/2021 | Drake | G06N 20/00 |
| 2021/0398439 A1* | 12/2021 | Li | G09B 7/02 |
| 2022/0004900 A1* | 1/2022 | Salahuddin | G06N 3/08 |
| 2022/0164635 A1* | 5/2022 | Johansen | G06V 10/764 |
| 2022/0179620 A1* | 6/2022 | Guttmann | G06F 9/505 |
| 2022/0188519 A1* | 6/2022 | Briody | G06N 3/08 |
| 2022/0207399 A1* | 6/2022 | Cataltepe | G06F 18/23 |
| 2022/0222531 A1* | 7/2022 | Tomioka | G06N 3/08 |
| 2022/0301295 A1* | 9/2022 | Livet | G06V 10/764 |
| 2023/0074683 A1* | 3/2023 | Dwivedi | G06N 3/08 |

\* cited by examiner

VALIDATING PERFORMANCE OF A NEURAL NETWORK TRAINED USING LABELED TRAINING DATA

CROSS-REFERENCE TO RELATED APPLICATIONS

Pursuant to 35 U.S.C. § 119(e), this application claims the benefit of U.S. Provisional Patent Application No. 62/889,059, filed on Aug. 20, 2019, the contents of which are hereby incorporated by reference herein in its entirety.

FIELD

The present disclosure generally relates to automatically validating whether newly learned neural network model parameters improve a performance of the neural network trained by automatically-labeled training and validation data.

BACKGROUND

Machine learning is an area of artificial intelligence that includes a field of study that gives computers the capability to learn without being explicitly programmed. Specifically, machine learning is a technology used for researching and constructing a system for learning, predicting, and improving its own performance based on empirical data and an algorithm for the same. The machine learning algorithms take a method of constructing a specific model in order to obtain the prediction or the determination based on the input data, rather than performing the strictly defined static program instructions.

The learning method of a Convolutional Neural Network (CNN) can be largely classified into supervised learning, unsupervised learning, semi-supervised learning, and reinforcement learning. Supervised learning is a type of system in which both input and desired output data are provided and labeled for classification to provide a learning basis for further data processing. Unsupervised learning is when an algorithm is only given input data, without corresponding output values, as a training set. Unlike supervised learning, there are no correct output values, or teachers. Instead, in unsupervised learning, algorithms are able to function freely in order to learn more about the data and present findings.

The semi-supervised learning is a combination of supervised and unsupervised machine learning methods, and utilizes both labeled training data and unlabeled training data. The goal of semi-supervised learning is to convert the unlabeled training data into labeled training data by classifying the unlabeled training data using the already labeled training data. As such, one of the key characteristics of the semi-supervised learning method is that the proximity between the labeled data and the unlabeled data are close. Reinforcement learning is a type of machine learning where a reinforcement agent learns how to behave in an environment by performing actions and seeing the results. Reinforcement learning differs from supervised learning in a way that in supervised learning the training data is associated with the answer key, so the model is trained with the correct answer itself. In contrast, in reinforcement learning, there is no answer, so the reinforcement agent decides what to do to perform the given task.

For a supervised learning method with a convolutional neural network, it is necessary to label training data that is newly captured through sensors connected to an edge device. However, labeling training data is an expensive process because supervised machine learning algorithms require a large amount of training data. The large amounts of training data also require a significant amount of manual human labor in order to manually label the training data with large enough volumes so that the performance of the trained neural network converges to an intended outcome. For example, supervised machine learning algorithms are required to have a large enough training data for a classification performance to result in an accuracy higher than a preset minimum threshold in a specific application domain. However, since it is not practical to manually label the training data when the edge device is shipped to a real-world environment, the present disclosure provides a novel method for automatically labeling the training data as a form of semi-supervised learning.

It follows that a possible solution to overcome the challenges of acquiring large enough training data without manual labeling is to automatically generate labels for unlabeled data. But there is no guarantee whether the neural network will perform within accepted parameters over a longer time period and after a series of model parameter updates based on the automatically generated labeled training data. Therefore, a need arises for the process of validating the performance of a neural network after a series of model parameter updates.

During semi-supervised learning and/or self-supervised learning, a machine learning algorithm may utilize a set of labeled data in order to approximate another set of unlabeled data during a transfer learning phase. However, since the results of the label approximation are by nature non-deterministic, the proposed label approximations and consequent output of the transfer learning using the approximated labels by the neural network are validated for degree of changes and correctness.

The validation is particularly important when the transfer learning is executed on an edge device because it is necessary to validate whether the newly learned neural network model parameters improve the performance of the neural network before updating the pre-existing model parameters. Accordingly, since it is also not practical to manually validate the newly learned model parameters when the edge device is shipped to the real-world environment, the present disclosure also provides a novel method for automatically validating the newly learned model parameters during a training phase on the edge device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
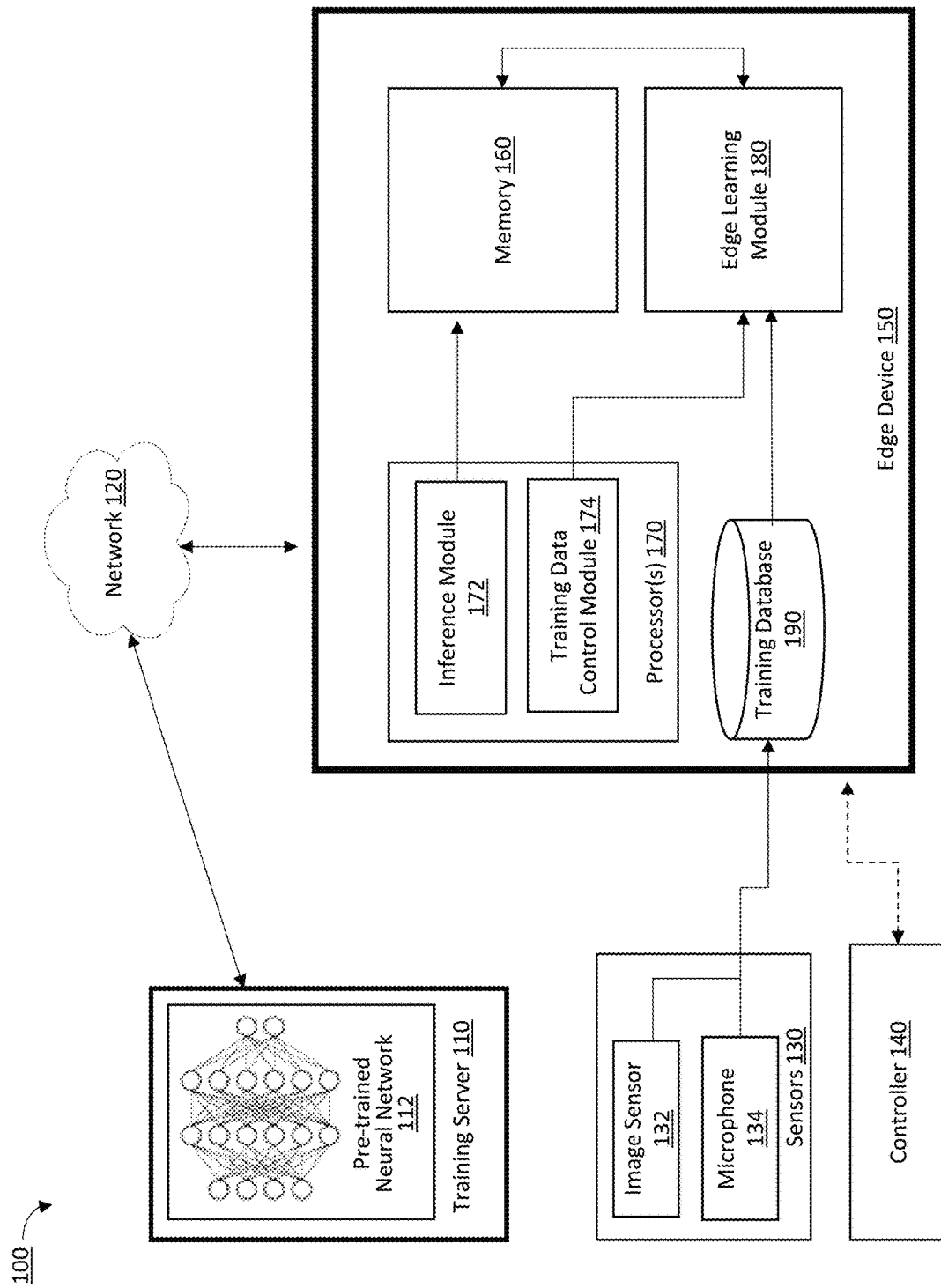
FIG. 1 is a block diagram of an example edge learning processing system in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

The present disclosure is directed to validating whether newly learned neural network model parameters improve a performance of the neural network before updating the pre-existing model parameters.

Embodiments of the present disclosure include validating a performance of a neural network trained using labeled training and validation data generated based on data collected by a device, including: determining proposed model parameters as potential updates to the neural network using the labeled validation data; performing a short-term validation on the proposed model parameters applied to the neural network based on the labeled validation data by comparing a first performance output and a second performance output; updating the currently-existing model parameters with the proposed model parameters when the second performance output outperforms the first performance output with respect to the labeled validation data, performing a long-term validation on the updated currently-existing model parameters applied to the neural network by determining a difference between original model parameters applied to the neural network and the updated currently-existing model parameters applied to the neural network; and performing an operation when the difference between the original model parameters and the updated currently-existing model parameters lies within a threshold. The labeled validation data is derived from a same dataset collected by the device as the labeled training data. The first performance output is determined from applying the proposed model parameters to the neural network and the second performance output is determined from applying currently-existing model parameters to the neural network. The updated currently-existing model parameters corresponds to up-to-date model parameters.

Embodiments of the present disclosure may further include discarding the labeled training data and the labeled validation data when the first performance output outperforms the second performance output with respect to the labeled validation data.

Embodiments of the present disclosure may further include adjusting the updated currently-existing model parameters when the difference between the original model parameters and the updated currently-existing model parameters lies outside the threshold. The adjusting of the updated currently-existing model parameters further comprising setting the updated currently-existing model parameters to a previously existing model parameters, performing a factory reset on the updated currently-existing model parameters to the original model parameters, or updating the updated currently-existing model parameters to a new set of model parameters over a network.

In some embodiments, the automatically-labeled validation data is labeled in accordance with a confidence level based on a first confidence condition, a second confidence condition, and a third confidence condition. The first confidence condition is determined by performing a data consistency check based on generating augmented data from each candidate data from among a subset of candidate data. The generated augmented data are being used as inputs into the first neural network to determine a first confidence condition for each of the subset of candidate data. The second confidence condition is determined by inputting the subset of candidate data from among the subset of candidate data into a second neural network that is trained using data from an environment. The second neural network is a version of the first neural network overfitted to the environment. The third confidence condition is determined by performing a clustering on the subset of candidate data. The results from the clustering on the subset of candidate data are used as inputs into a third machine learning approach to determine a third confidence condition.

In some embodiments, the comparison of the first performance output and the second performance output is based on performing a stratification of k-folds.

In some embodiments, the difference between original model parameters applied to the neural network and the updated currently-existing model parameters applied to the neural network is determined by comparing a first median average precision related to a first performance of the neural network with the original parameters and a second median average precision related to a second performance of the neural network with the updated currently-existing model parameters.

In some embodiments, the threshold or the original model parameters is set through updates over a network.

Embodiments of the present disclosure may further include saving an instance of the currently-existing model parameters as a previously existing model parameter before updating the currently-existing model parameters with the proposed model parameters.

In some embodiments of the present disclosure, the updating of the currently-existing model parameters with the proposed model parameters may further include transferring the proposed model parameters to a memory to replace the updated currently-existing model parameters. The memory is accessible by a neuromorphic processor.

In some embodiments of the present disclosure, the automatically-labeled training data and validation data is sampled and augmented before performing the short-term validation and long-term validation.

Another embodiment of the present disclosures includes an edge device comprising one or more processors; a non-transitory memory, which, when executed by the one or more processors, cause the edge device to perform determining proposed model parameters as potential updates to the neural network using the labeled validation data; performing a short-term validation on the proposed model parameters applied to the neural network based on the labeled validation data by comparing a first performance output and a second performance output; updating the currently-existing model parameters with the proposed model parameters when the second performance output outperforms the first performance output with respect to the labeled validation data; performing a long-term validation on the updated currently-existing model parameters applied to the neural network by determining a difference between original model parameters applied to the neural network and the updated currently-existing model parameters applied to the neural network; and performing an operation when the difference between the original model parameters and the updated currently-existing model parameters lies within a threshold.

In some embodiments of the present disclosure, the method for validating a performance of a pretrained neural network trained by automatically-labeled training and validation data that is generated based on data collected by a device is implemented as a set of computer readable instructions that are executed at a device.

The present disclosure is not limited to what has been described above, and other aspects and advantages of the present disclosure not mentioned above will be understood through the following description of embodiments of the present disclosure. Further, it will be understood that the aspects and advantages of the present disclosure may be achieved by the configurations described in claims and combinations thereof.

In accordance with some implementations, an electronic device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of an electronic device, cause the electronic device to perform or cause performance of any of the methods described herein. In accordance with some implementations, an electronic device includes: one or more processors, a non-transitory memory, and means for performing or causing performance of any of the methods described herein.

DETAILED DESCRIPTION

Hereinafter, the embodiments disclosed in the present specification will be described in detail with reference to the accompanying drawings, the same or similar elements regardless of a reference numeral are denoted by the same reference numeral, and a duplicate description thereof will be omitted. In the following description, the terms "module" and "unit" for referring to elements are assigned and used exchangeably in consideration of convenience of explanation, and thus, the terms per se do not necessarily have different meanings or functions. Wherever possible, the same reference numbers will be used throughout the drawings to refer to the same or like parts. In the following description, known functions or structures, which may confuse the substance of the present disclosure, are not explained. The accompanying drawings are used to help easily explain various technical features, and it should be understood that the embodiments presented herein are not limited by the accompanying drawings. As such, the present disclosure should be construed to extend to any alterations, equivalents, and substitutes in addition to those which are particularly set out in the accompanying drawings.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

FIG. 1 is a block diagram of an example edge learning processing system 100 in accordance with some implementations. In various implementations, the example edge learning processing system 100 or portions thereof are included in an edge device 150 (e.g., the edge device 1100 shown in FIG. 11), a controller, or a suitable combination thereof. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the example edge learning processing system 100 includes at least a training server 110, a network 120, sensors 130, a controller 140, and an edge device 150. In some implementations, the training server 110 includes at least a pre-trained neural network 112 and neural network parameters. In some implementations, the sensors 130 includes at least an image sensor 132 and a microphone 134. In some implementations, the edge device 150 includes at least a memory 160, one or more processors 170, a training database 190, and an edge learning module 180.

In the example edge learning processing system 100, two different types of neural network training phases make up the edge learning process. The first phase of the neural network training is performed on the training server 110. The second phase of the neural network training is performed on an edge device 150 with one or more processors 170. The second phase neural network training utilizes the pre-trained neural network 112 at the first phase as the basic network. The systems and methods in the present disclosure are applied to the refinement of a neural network model at a transfer learning process after the edge device 150 is deployed into a locally constrained physical environment. This approach assumes that the neural network learns from the input data that are captured by an edge device deployed in a constrained physical space with a known fixed number of classes. Accordingly, the edge learning methods can be deployed into numerous types of consumer electronics and appliance that are designed to utilize artificial intelligence and machine learning techniques for their services and functions.

During the edge learning process, a part of the input data (e.g., collected by the sensors 130) is used for training and validation of the transfer learning. There are certain types of neural networks that requires the training data to be labeled. For example, a supervised learning with a CNN is an example of a neural network that requires labeling of the training data. Normally, the training data is labeled by human annotators before the training process on a training server 110 prior to an actual neural network training process. However, for edge devices such as edge device 150, it is impractical to perform the manual annotation in order to label the training data when the edge device 150 is deployed into a real-world environment. For example, during the neural network training process, it is not feasible to ask or expect a consumer of the edge device 150 to collect and label the newly acquired training data. In addition, it is not practical to enter each consumer's home in order to collect data and train the edge device 150 of the consumer. As such, the present disclosure automatically labels (or approximates) training data through an automatic labeling method after the edge device is deployed in a consumer's home.

The training server 110 serves to provide various services related to training and testing a pre-trained neural network 112 described in an implementation of the present disclosure. A training server trains the pre-trained neural network 112 prior to deploying the edge device 150 into a locally constrained physical space. A pre-trained neural network model is designed and trained based on the goal of a task. As an example, the pre-trained neural network 112 may be pre-trained on the training server 110 located at a factory and occurs before the edge devices are sent to consumers. Accordingly, the edge learning is a transfer learning approach such that a base neural network is designed for a specific function (such as image classification), and then the pre-trained and optimized base neural network is transferred to a memory 160 that the edge device 150 can access.

In some implementations, the edge device 150 may correspond to various consumer devices such as a robot, a robot cleaner, a refrigerator, a television, air conditioner, or the like. The edge devices may correspond to devices that are designed to include artificial intelligence functionality such as image processing or voice recognition. In some implementations, the edge device 150 may acquire images, videos, or audio data using the image sensor 132 or microphone 134 provided therein, may store some of the acquired images, videos, or audio data in the memory 160 of the edge device 150, and may store some of the images, videos, or audio data in a storage memory of a computer connected to a network 120 by transmitting them to the computer.

In some implementations, the processor 170 includes at least an inference module 172 and a training data control module 174. Generally, the inference module 172 uses a neural network to perform classification or regressions results and the training data control module 174 performs functions that learn from the training data and trains the neural network to handle certain tasks.

As shown by block 405, the inference module 172 checks the consistency of the labels by comparing candidate labels with the other candidate labels in the augmented data group with the same group ID. If the inference module 172 determines that the candidate label of the input data is consistent with the other labels in the same group, then, as shown by block 407, the inference module 172 generates a first confidence condition based on the inference result consistency check. The first confidence condition will be combined with a second confidence condition and a third confidence condition in order to determine whether results from the three confidence upgrade techniques (e.g., data augmentation, slightly overfitted neural network, clustering) pass a confidence upgrade criterion that is confident enough to use the approximated label.

In some implementations, the inference module 172 stores the auto-labeled training and validation data with labels in memory 160 (e.g., the memory 160 shown in FIG. 1). In some implementations, storing the auto-labeled training and validation data with labels further comprises weighting the candidate label confidence label and upgraded the label through a confidence upgrade criterion. In some implementations, weighting the candidate label confidence is performed by increasing a weight of a first confidence condition based on a confidence of the candidate label when the candidate label is consistent with the other candidate labels in the augmented data group with the same group ID.

If the inference module 172 determines that the candidate label of the input data is not consistent with the other labels in the same group, then, as shown by block 403, the inference module 172 inputs the inference results between the training/validation data and the augmented data back into the first neural network (e.g., pre-trained neural network 112 shown in FIG. 1).

The inference module 172 repeats the inference result consistency check 400 for each data in the augmented training data in the augmented validation data such that a confidence upgrade label is automatically assigned to each of the corresponding training and validation data.

Figure 5A:
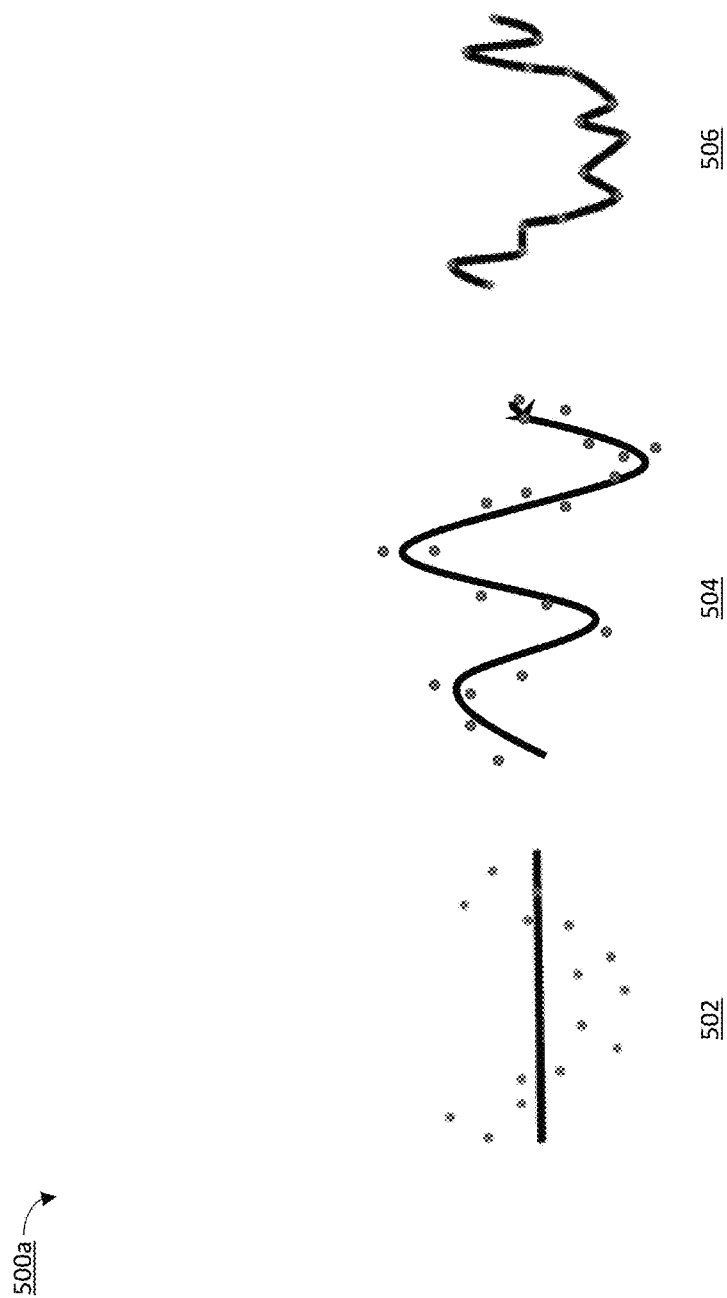
FIG. 5A is a diagram illustrating different types of neural network fitting in accordance with some implementations

FIG. 5A is a diagram illustrating different types of neural network fitting in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. FIG. 5A is a simplified diagram 500a illustrating the relationship between underfitting 502, slightly overfitting 504, and overfitting 506.

Underfitting 502 refers to a model that cannot model training data nor generalize to new data. A model is underfitting when the metrics given for the training data are poor, meaning that the training accuracy of the model is low and/or the training loss is high. If a model is underfitting then the model is unable to classify data it was trained on. Thus, it is likely to perform poorly at predicting data that it has not seen before.

Overfitting 506 refers to a model that models the training data too well. Overfitting happens when a model learns the detail and the noise in the training data to the extent that it negatively impacts the performance of the model on new data. This means that the noise and random fluctuations in the training data are picked up and learned as concepts by the model.

In general, overfitting 506 is considered a feature that is typically avoided in machine learning because an overfitted neural network does not generalize to random input vectors. Instead of learning the general distribution of data, the model learns the expected output for every data point. As such, the overfitted neural network cannot be used for random input data in a general problem domain.

The edge device 150 takes advantage of a slightly overfitted 504 neural network in order to intentionally induce a biased neural network to approximate the labels of training and validation data. The goal of slightly overfitted neural network is to have a locally biased inference neural network on each edge device in a specific region after a series of neural network model parameter updates. This means that a neural network on an edge device in a specific region will behave differently from another neural network on other edge devices even though the edge devices are optimized at a factory with the same neural network.

For an edge device 150 that handles a neural network-based image classification problem, there is a much higher chance for input images inside a consumer's house to be similar to each other over a period of time of operating the edge device because the edge device 150 operates in the same environment repeatedly. When the edge device is deployed in the consumer's home, the edge device can handle a slight overfitting because the edge device is already placed in a physically constraint environment (e.g., the consumer's home). As such, when the robot vacuum continues to operate and clean the consumer's home, the robot vacuum will see the same objects repeatedly which causes the robot to feedback approximated label data in a feedback process that will naturally bias the neural network on the robot vacuum. This slightly overfitted neural network allows the robot vacuum to better learn a user's specific home (i.e., the furniture, people, or the like specific to the environment). Thus, the variation of the input images and the feature vectors will be reduced. This is particularly true when the neural network model is designed and intended to be used for a fixed number of predefined and known classes. In other words, a generalization of the neural network performance is not a strong goal of the system—instead, a slightly overfitted performance in a constrained physical space is expected and allowed.

Figure 5B:
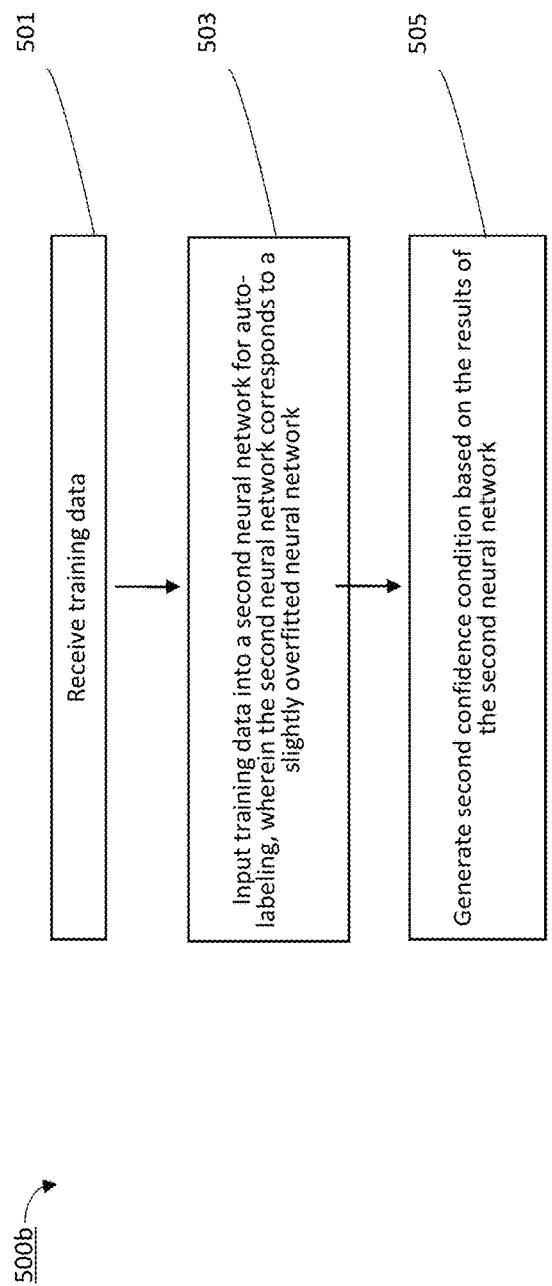
FIG. 5B is a flowchart representation of using pre-trained neural networks to perform a confidence upgrade using a slightly overfitted neural network in accordance with some implementations.

FIG. 5B is a flowchart representation of using pre-trained neural networks to perform a confidence upgrade using a slightly overfitted neural network in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. In some implementations, the slightly-overfitted neural network process 500b is performed on the edge learning module 180 on the edge device 150. As an initial matter, a neural network is pre-trained (e.g., the pre-trained neural network 112 shown in FIG. 1) for performing confidence upgrade. There are multiple methods to design and train the neural network in order to perform a confidence model. In some implementations, the slightly-overfitted characteristics of a neural network provide a second confidence condition in a confidence upgrade criteria that is used for the auto-labeling task.

As a non-limiting example, at the factory, the edge devices may have the same pre-trained neural network programmed on the edge device 150. Here, the pre-trained neural network on the edge device 150 (e.g., the edge device 150 shown in FIG. 1) is optimized to avoid overfitting (e.g., overfitting 506 shown in FIG. 5A) the neural network. However, once the edge device 150 is shipped out and deployed in a consumer's home, the need for the generalization becomes weaker and the need for the edge device 150 and its neural network to adapt to the specific physical space becomes greater.

Figure 2:
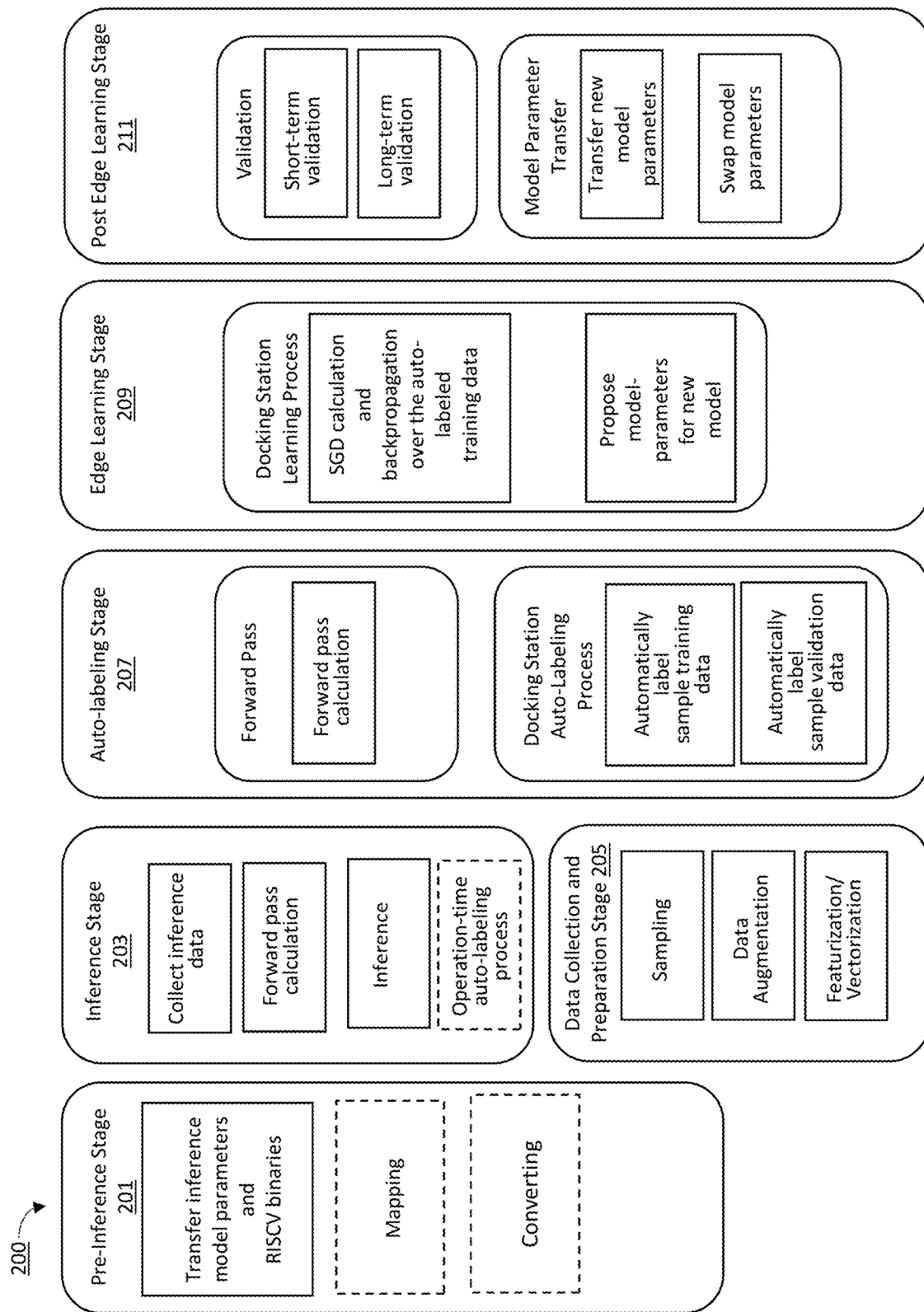
FIG. 2 is a block diagram showing edge learning tasks at different stages in accordance with some implementations.
Figure 3:
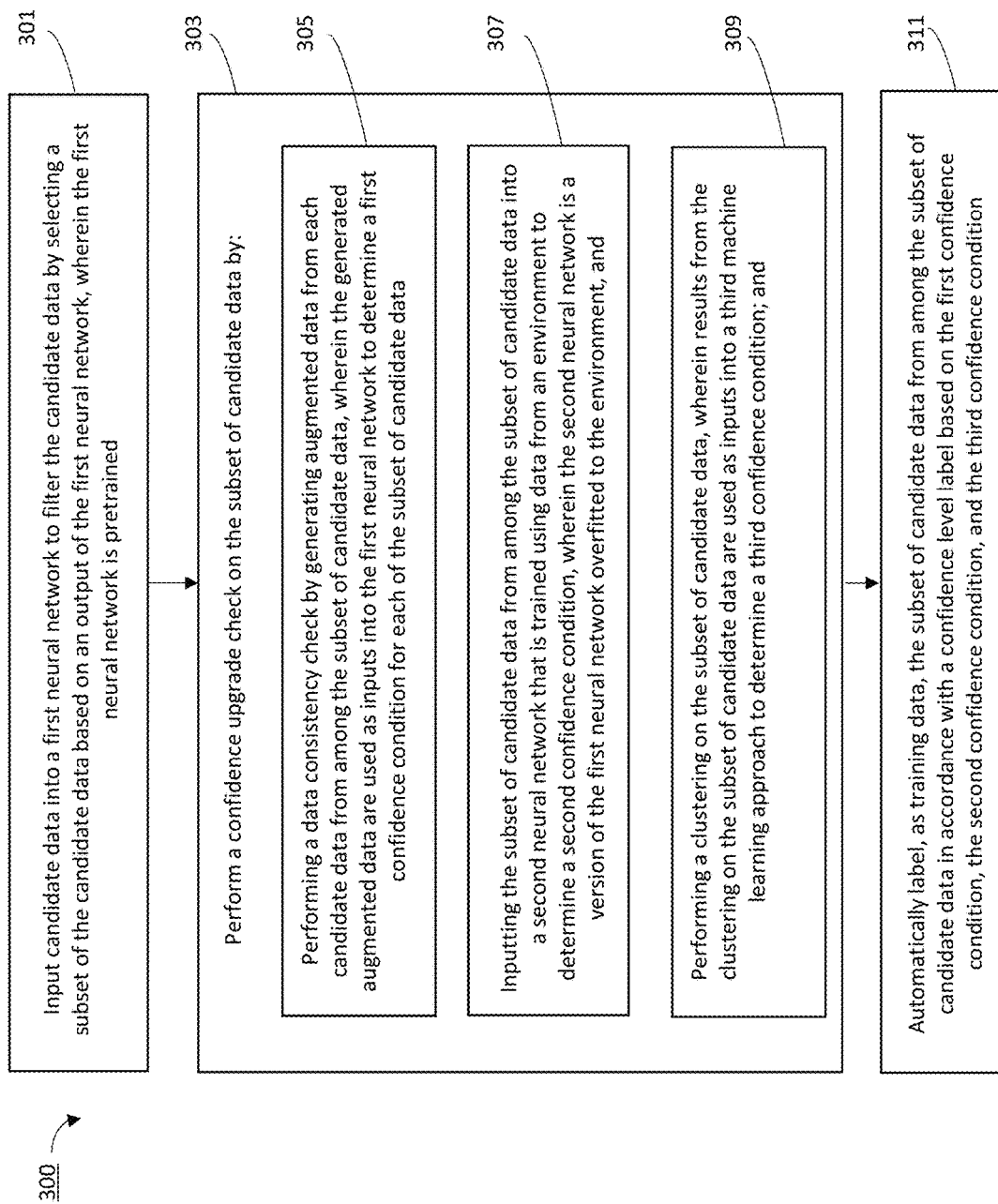
FIG. 3 is a flowchart representation of a method of automatically labeling training and validation data in accordance with some implementations.

As shown by block 501, the slightly overfitted neural network process includes receiving training data from a training database 190. As an example, training data is collected while the robot cleaner operates, but training is not performed while the robot clear operates. Instead, the robot cleaner simply captures images and saves frames in a memory space. As mentioned in FIG. 2, the edge device 150 initiates the transfer learning process while the robot cleaner is docked in order to efficiently utilize its hardware resources.

As shown by block 503, the edge device 150 inputs training data into a second neural network for auto-labeling, wherein the second neural network corresponds to a slightly overfitted neural network model. In some implementations, the slightly overfitted neural network utilizes a copy of the same inference neural network model as the pre-trained neural network (e.g., pre-trained neural network 112 shown in FIG. 1) to generate the slightly overfitted neural network by relaxing parameters such that the requirements of non overfitting are relaxed. Accordingly, the edge device 150 utilizes the slightly overfitting neural network in order to cause the neural network to adapt and become bias for a limited input data. As mentioned above in the robot vacuum example, utilizing a slightly overfitting process is acceptable because the number of classes is known and fixed for the neural network and because the variation of the input data is less than the general cases because the input training and validation data are captured in the same physical space. In addition, the edge device 150 also attempts to regulate a degree of the overfitting process based on a predefined value so that the neural network does not lose the generalization aspects all at once. The goal is to gradually allow the overfitting of the neural network on a small scale with a small portion by the predefined degree.

As shown by block 505, the edge device 150 generates a second confidence condition based on the results from the second neural network. The second confidence condition will be combined with the first confidence condition and the third confidence condition in order to determine whether results from the three confidence upgrade techniques (e.g., data augmentation, slightly overfitted neural network, clustering) pass a confidence upgrade criterion that is confident enough to use approximated labels.

Figure 6:
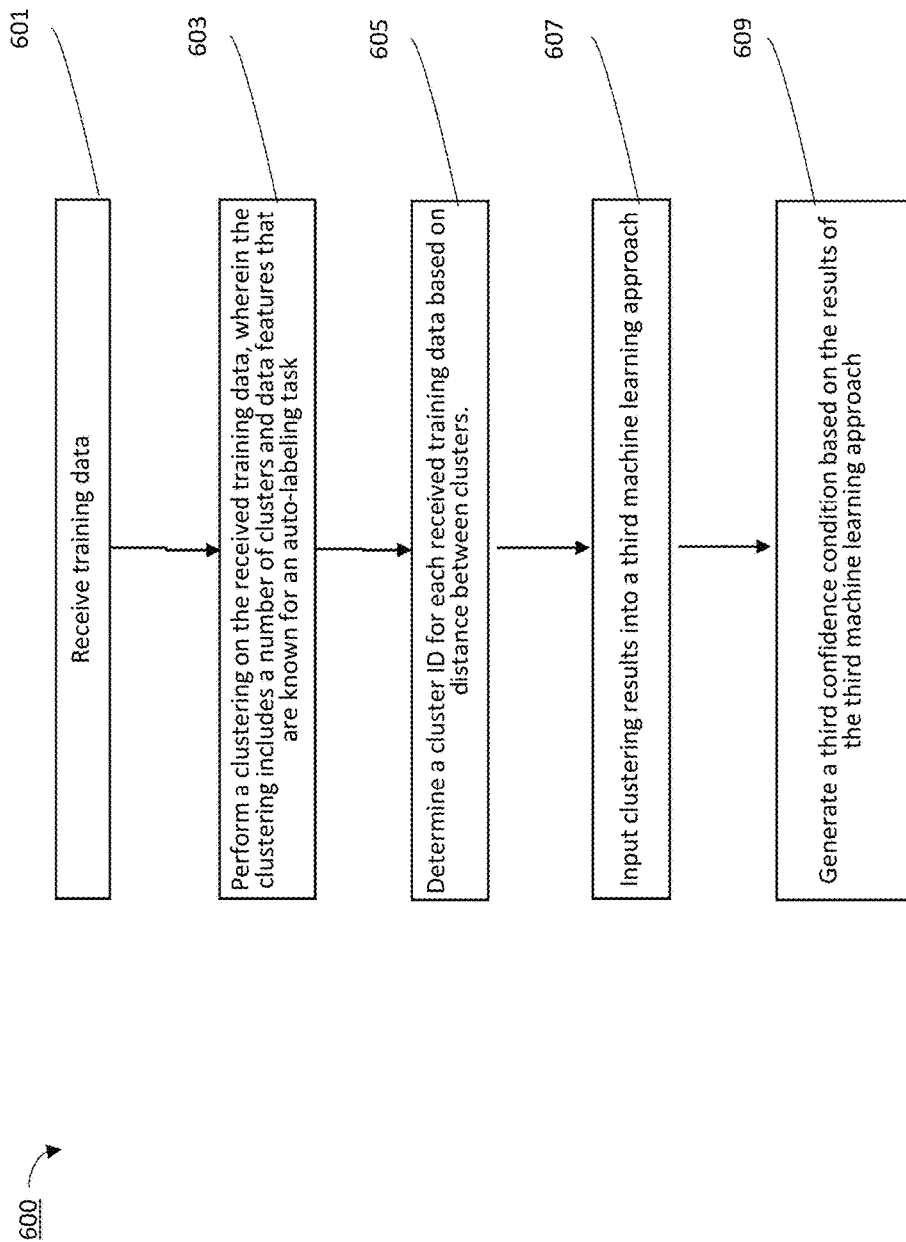
FIG. 6 is a flowchart representation of using pre-trained neural networks to perform a confidence upgrade using a clustering approach in accordance with some implementations.

In some implementations, the confidence upgrade process using a slightly overfitted neural network process may be formalized as follows:

$$y_i = M(x_i)$$

$$y_i' = M_k'(x_i)$$

$$C_i(x_i) = y_i + w'(y_i'), \{c_{i,j}=1: \text{if } c_{i,j}>1, c_{i,j}=0: \text{if } c_{i,j}<0, c_{i,j} \in C_i(x_i)\} \quad (2)$$

where the terms to this equation are defined as follows:
$x_i$: ith input vector, $x_i \in X_s$
M: a pre-trained base neural network model for inference
$M_k'$: a slightly overfitted neural network model under the constraints k
$y_i$: Softmax output for input $x_i$ by the pre-trained base neural network model M
$y_i'$: Softmax output for input $x_i$ by the overfitted neural network model $M_i'$
$w'$: weight for the output of overfitted neural network
$C_i(x_i)$: output of confidence upgrade for input $x_i$
$c_{i,j}$: jth scalar value, $c_{i,j} \in C_i(x_i)$ FIG. 6 is a flowchart representation of using pre-trained neural networks to perform a confidence upgrade using a clustering approach in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. In some implementations, the clustering approach 600 is performed on the edge learning module 180 on the edge device 150.

The present disclosure utilizes a clustering approach 600 that is similar to a K-means clustering algorithm in order to provide a third confidence condition in the confidence upgrade criteria used for the auto-labeling task. The variation of K-means clustering is referred to as L-means clustering. The K-means clustering algorithm is an iterative algorithm that tries to partition the dataset into K pre-defined distinct non-overlapping clusters where each data points belongs to only one group. The K-means clustering algorithm aims to find and group in classes the data points that have a high similarity between them such that data points in the same cluster (or subgroup) are similar while data points in different clusters are different. It assigns data points to a cluster such that the sum of the squared distance between the data points and the cluster's centroid (arithmetic mean of the data points that belong to that cluster) is at the minimum.

However, unlike traditional K-means clustering algorithms, the edge device 150 implements a clustering algorithm with a known k number such that the edge device 150 starts with a base model that is aware of the data (scatter plot) for each of the data. The scatter plot of the pre-defined reference points for each cluster is initially guided by the predefined set of training data. Accordingly, the L-means clustering is based on an unsupervised learning approach in a sense that this variation of the traditional K-means clustering method is applied to the newly acquired unlabeled training data.

As shown by block 601, the edge device 150 receives training data from the training database (e.g., the training database 190 shown in FIG. 1). In some implementations, the training data is sampled. In some implementation, the training data consists of at least one of non-augmented data or augmented data.

As shown by block 603, the edge device 150 performs a clustering on the received training data, wherein the clustering includes a number of clusters and data features that are known for an auto-labeling task. Unlike a traditional K-means clustering algorithm, the number of clusters is decided by the number of classes from the first and second neural networks, and the initial centroids of the data features are calculated and known based on pre-defined reference points for each of the clusters, rather than randomly initialized for the auto-labeling task in the clustering approach 600. As such, the edge device 150 (e.g., the edge device 150 shown in FIG. 1) starts with a fixed number of clusters (e.g., a cluster is assigned for each class) with known reference points (e.g., data points from training data that were used at a factory). This allows the initialization to begin with a fixed number of clusters with the known reference points. The known reference data points are the same as the data points from the training data that were used at the factory.

As shown by block 605, the edge device 150 determines a cluster ID for each received training data based on distance between the clusters. The edge device 150 can determine the classes that the received training data belongs to because a cluster is assigned for each class. Therefore, the edge device 150 forms clusters by comparing similarities between distance measurement for newly acquired training data and the known reference data points. In some implementations, the distance measurement used is a squared Euclidean distance.

As an example, the edge device 150 may initialize the clustering with a k constant of 5, wherein the number is acquired from the previous neural network classification tasks. This means that the edge device 150 will generate 5 clusters, each of which belongs to a different class in a hyperspace. Next, the edge device 150 calculates distances between the data and the 5 clusters and will repeat the process over again until there is no change to a centroid (e.g., assignment of data points to the clusters does not change). Finally, the edge device 150 classifies the data into 5 clusters based on the proximity of the data to each other. The closer the data points are, the more similar and likely the data points will belong to the same cluster.

As shown, by block 607, the edge device 150 inputs the clustering results into a third machine learning approach. The third machine learning approach is a separate neural network from the first neural network and the second neural network that is based on unsupervised learning as a form of L-means clustering. In some implementations, the third machine learning approach may be interpreted to describe the entire L-means clustering process.

As shown, by block 609 the edge device 150 generates a third confidence condition based on the results of the third machine learning approach. The third confidence condition will be combined with the second confidence condition and the first confidence condition in order to determine whether results from the three confidence upgrade techniques (e.g., data augmentation, slightly overfitted neural network, and clustering) pass a confidence upgrade that is confidence enough to use approximated labels.

Figure 7:
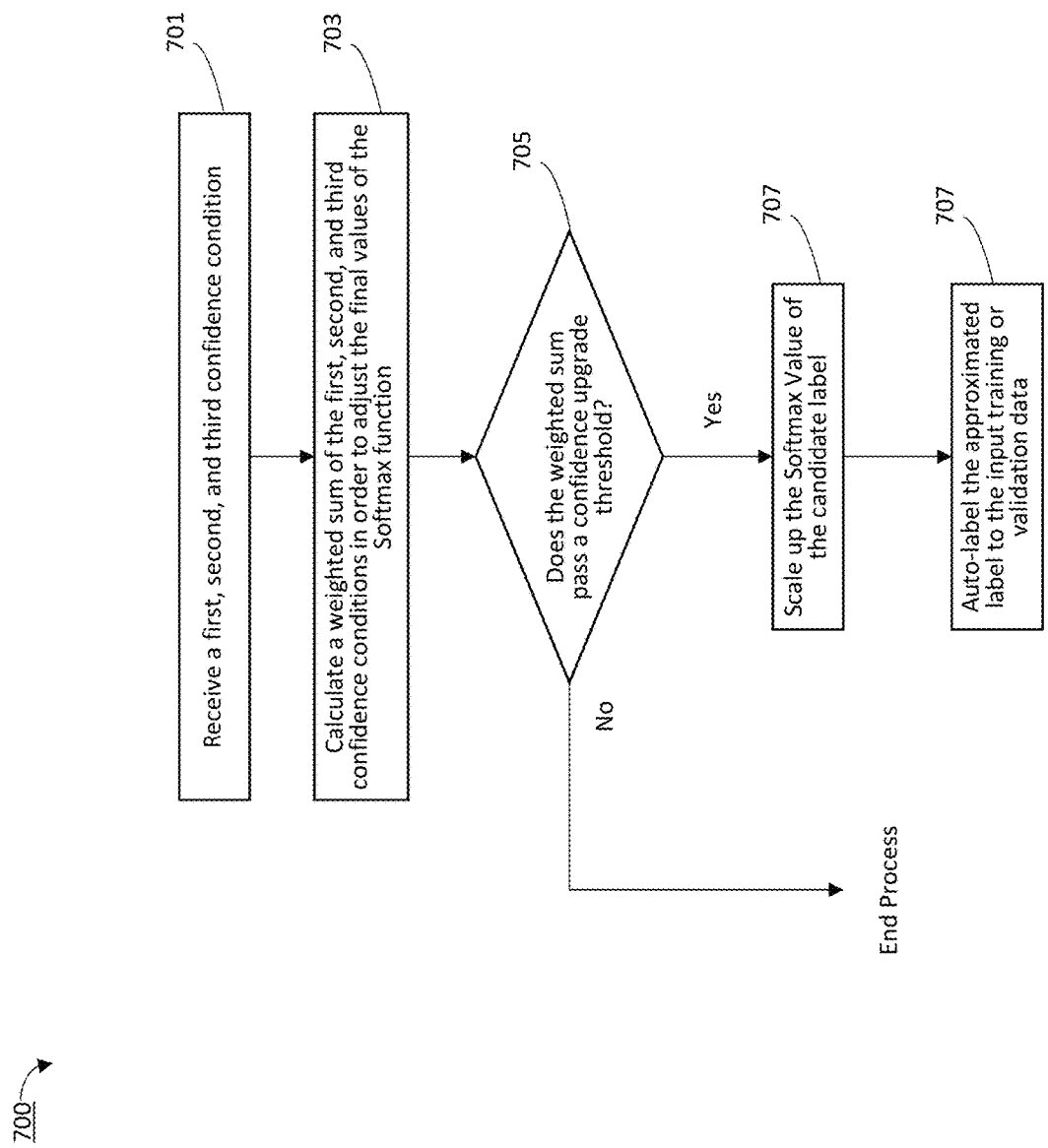
FIG. 7 is a flowchart of performing a confidence upgrade in accordance with some implementations.

In some implementations, the clustering approach 600 may be formalized as follows:

Initialize $L_k'$ with selected $x_o \in X$ for each of l output nodes for M repeat 1) and 2) below until k=constraints for stop criteria 1) $\operatorname*{argmin}_{L'} \sum_{j=1}^{l} \sum_{x_i \in X_s} \|x_i - \mu_j\|^2$, where $l$ is prefixed and $L' = \{l_1', l_2', \ldots, l_l'\}$ 2) $\mu_j = \frac{1}{|X_s|} \sum_{x_i \in X_s} x_i$ 3) $l_j' = L_k'(x_j)$ where the terms to this equation are defined as follows:
$x_o$: an input vector, $x_o \in X$
$x_i$: ith sampled input vector, $x_i \in X_s$
$x_j$: jth sampled input vector, $x_j \in X_s$
M: a pre-trained base neural network model for inference
$\mu$: a set of means by $\forall x \in X$, where $|\mu|$ is known by the number of output nodes by M
$\mu_r$: a mean of points, $\mu_r \in \mu$
$L_k'$: L-means clustering under the constraints k
$l_j'$: cluster ID for input $x_j$ by the L-means clustering $L_k'$ under the constraints k
l: prefixed number of clusters that is equal to the number of output nodes FIG. 7 is a flowchart of performing a confidence upgrade in accordance with some implementations. While certain specific features are illustrated, those skilled in the art will appreciate that from the present disclosure that various other features have not been illustrated for the sake of brevity, and so as not to obscure more pertinent aspects of the implementations disclosed herein. In some implementations, the confidence upgrade process 700 is performed by the edge learning module 180 (e.g., the edge learning module 180 shown in FIG. 1) on the edge device 150.

As shown in box 701, the confidence upgrade process receives a first confidence condition corresponding to results from the inference result consistency check (as described in FIG. 4), a second confidence condition corresponding to results from the slightly overfitted neural network (as described in FIG. 5B), and a third confidence condition relating to the clustering ID with a similarity measurement (as described in FIG. 6).

As shown in box 703, the edge device 150 calculates a weighted sum of the first confidence condition, the second confidence condition, the third confidence condition, in order to adjust the final values of the Softmax function. In some implementations, the similarities and the cluster ID are used as part of the weighted adjustment for the scaled-up Softmax value for the label candidate. In some implementations, the initial Softmax values can be calculated as a result of the pre-trained base neural network model. Then, the final Softmax values are scaled-up from the initial Softmax values, as a weighted adjustment (i.e., the weighted sum of the first confidence condition, the second confidence condition, and the third confidence condition). Once the weighted sum of the output from the slightly overfitted neural network inference, the L-means clustering ID with similarity measurement, and the Softmax function are calculated and meets the confidence upgrade threshold, the Softmax function value of the candidate label is scaled up and the approximated label is assigned to the input training or validation data. In some implementations, a Softmax output of ~90% typically corresponds to a high confidence level.

As shown in box 705, the edge device 150 determines whether the weighted sum passes a confidence upgrade threshold. If the weighted sum passes a confidence upgrade threshold ("Yes" path of box 705), then the confidence upgrade process 700 scales up the Softmax function value of the candidate label, as shown in box 707. However, if the weighted sum does not pass a confidence upgrade threshold ("No" path of box 705), then the confidence upgrade process 700 ends.

As shown in box 709, the edge device 150 auto-labels the approximated label to the input training or validation data.

In some implementations, the confidence upgrade process by using a slightly overfitted inference neural network, the L-means clustering ID with similarity measure, and the Softmax function are formalized as follows:

$$y_i = M(x_i)$$

$$y'_i = M'_k(x_i)$$

$$C_i(x_i) = y_i + w'(y'_i) * w''' A(x_i, X_i^a),$$

$$l_i^0 = \max_{label}(C_i(x_i))$$

$$l'_i = L'_k(x_i)$$

$$C'_i(x_i) = C_i(x_i) + w''(y'_i) \text{ if } l_i^0 \text{ is equal to } l'_i,$$

$$C'_i(x_i) = C_i(x_i) - w''(y'_i) \text{ if } l_i^0 \text{ is not equal to } l'_i,$$

$$l_i = \max_{label}(C'_i(x_i))$$

where the terms to this equation are defined as follows:
$x_i$: ith input vector, $x_i \in X_s$
$X_i^a = \{x_i^1, x_i^2, \ldots, x_i^{n_a}\}$: a set of augmented data from the ith input vector, $x_i \in X_s$
$A(x_i, X_i^a)$: a function for inference consistency of the augmented data $X'''$
M: a pre-trained base neural network model for inference
$M_k'$: a slightly overfitted neural network model under the constraints k
$y_i$: Softmax output for input $x_i$ by the pre-trained base neural network model M $y_i'$: Softmax output for input $x_i$ by the overfitted neural network model $M_k'$
w': weight for the output of overfitted neural network
w'': weight for the output of overfitted neural network on the condition of $L_k'$ result
w''': weight for the inference consistency output of $A(x_i, X_a)$
$L_k'$: L-means clustering
$C_i(x_i)$: output of the initial confidence upgrade for input $x_i$
$l_i^0$: label with the maximum Softmax output by the initial confidence upgrade $C_i(x_i)$
$l_i'$: cluster ID for input $x_i$ by the L-means clustering $L_k'$ under the constraints k
$C_i'(x_i)$: output of the confidence upgrade for input $x_i$, with the weighted adjustment on the condition of $L_k'$ result
$l_i$: final estimated label for $x_i$ Short-Term and Lone-Term Validation It follows that a possible solution for overcoming the challenges of acquiring enough training data without manual labeling is to automatically generate labels for unlabeled data as described above. However, there is no guarantee whether the neural network will perform within accepted parameters over a longer time period and, also, after the neural network is updated with a series of different model parameter updates based on automatically generated labeled training data. Therefore, a need arises for validating the performance of a pre-trained neural network trained by automatically-labeled training and validation data after a series of model parameter updates.

In machine learning, the semi-supervised learning and/or self-supervised learning methods utilize a set of labeled data in order to approximate a set of un-labeled data during a transfer learning phase. Accordingly, changes due to the approximation results being non-deterministic, the proposed label approximations and consequent output of the transfer learning using the approximated labels by the neural network are validated for correctness and its degree of. As such, the goal of the edge device transfer learning process is to monitor whether the repeated updates of the model parameters using the approximated labels are within a predefined range of performance in terms of accuracy. The validation is particularly useful when the transfer learning is executed on an edge device. In some implementations, the validation may be applied to a smaller size of mini-batch training data in order to incrementally learn from newly acquired data on the edge device. The goal of the validation process is to see a relative improvement of the newly learned and proposed model parameters in a specific physical space under physical constraints while risking a slightly overfitting of the model parameters rather than to see a generalized improvement of the neural network model for general cases.

Figure 8:
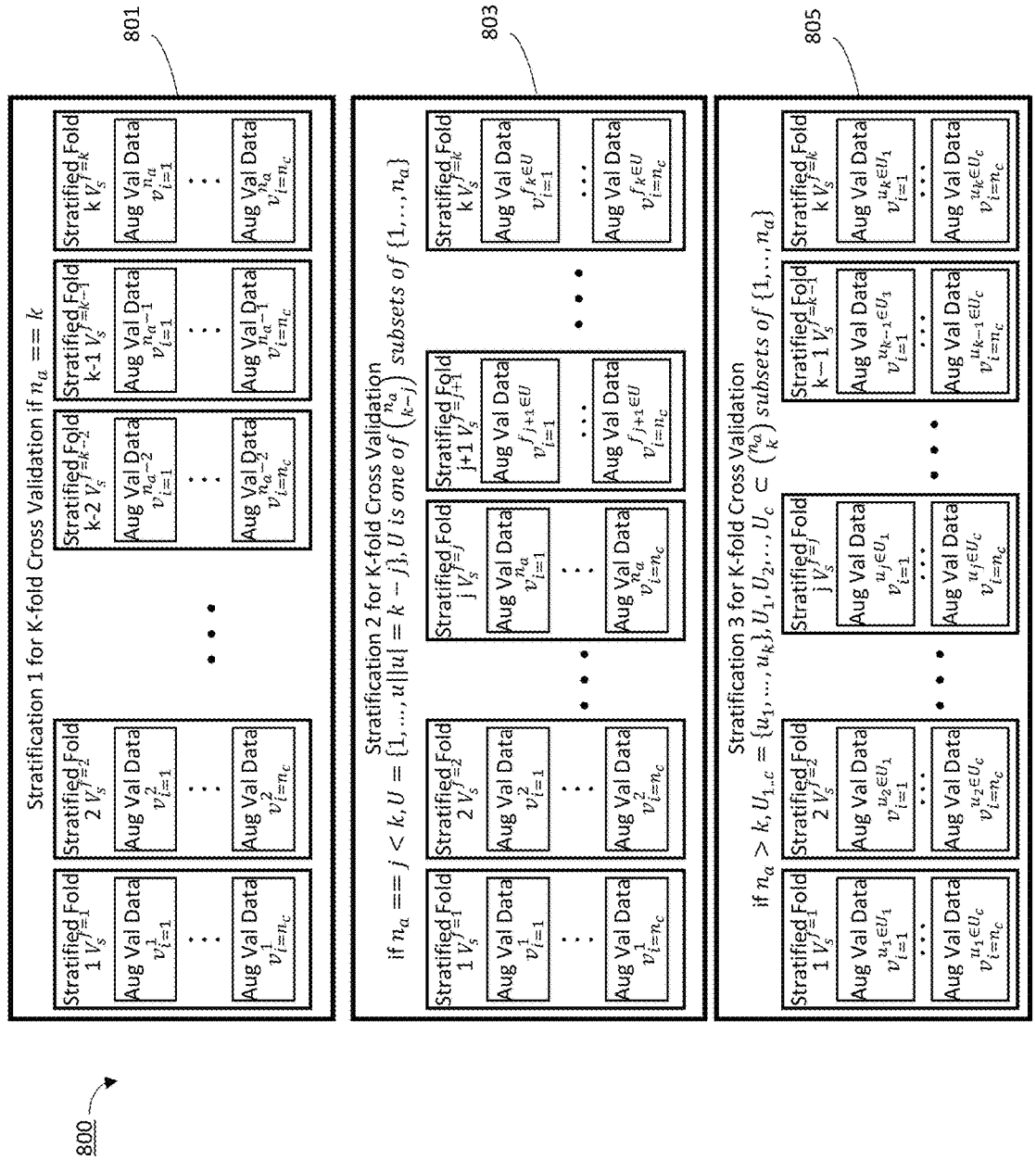
FIG. 8 is an embodiment of performing stratification for k-fold utilizing the augmented validation data in accordance with some implementations.

FIG. 8 is an embodiment of performing stratification for k-fold utilizing the augmented validation data in accordance with some implementations. The edge device 150 (e.g., the edge device 150 shown in FIG. 1) applies a stratified k-fold cross validation technique to automatically labeled training and validation data in a novel way. Although the automatically labeled validation data does not guarantee the correctness of the approximation in a deterministic way, the labels of the augmented data from the automatically labeled data provide a practice cue that the data representation of the validation data is evenly distributed in the k-fold subsets of the validation data. Here, the stratification process 800 attempts to validate the newly proposed model parameters over the automatically generated (or approximated) labeled data on the edge device.

Figure 4:
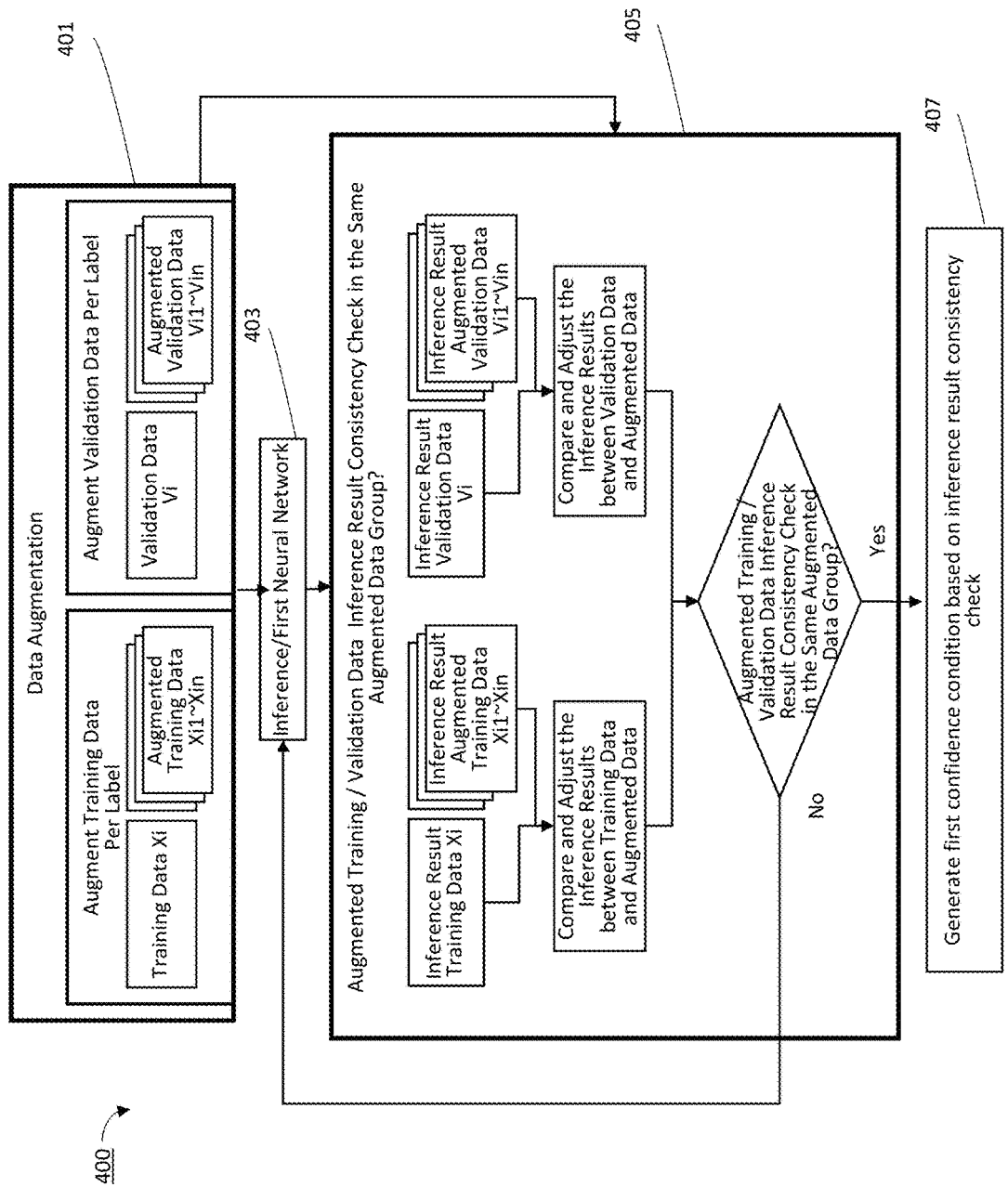
FIG. 4 is a flowchart representation of performing an inference result consistency check in an augmented data group in accordance with some implementations.

In some implementations, the stratification process 800 includes performing a stratification of k-fold (e.g., subsets of the automatically-labeled validation data) based on the augmented data group and the inference result consistency check (explained in further detail with respect to FIG. 4). The stratification is a process of making the data representation in each fold not be biased such that the data representation in each fold is fairly distributed among the given number of classes (e.g., $n_c$) by having the data points from each class present in each fold. Since the edge device 150 (e.g., the edge device 150 shown in FIG. 1) augments the validation data per label, each augmented data per label can be assigned to each fold in the stratification process.

In some implementations, the stratification process is formalized as follows:

$$V_s^{f=1} = \{v_{i=1}^1, v_{i=2}^1, \ldots, v_{i=n_c}^1\}$$

$$V_s^{f=2} = \{v_{i=1}^2, v_{i=2}^2, \ldots, v_{i=n_c}^2\}$$

$$\ldots V_s^{f=k} = \{v_{i=1}^k, v_{i=2}^k, \ldots, v_{i=n_c}^k\}$$

where the terms to these components are defined as follows:

$n_c$: number of classes
$n_a$: number of augmentations per each source input vector
k: number of folds
$v_i^f$: $i_{th}$ vector for validation, $v_i^f \in V^f$,
$V^f$: a fold as a subset of vectors for validation, $V^f \subset V_c$
$V_s^f$S a stratified fold as a subset of vectors for validation, $V_s^f \subset V_c$
$V_c$: a set of vectors for validation for class c In some implementations, the size of k is predefined during base model training. It is also noted that the size of k is not necessarily the same as $n_a$ while the stratification should have a good representation of the $n_c$ classes. Therefore, the $n_a$ are distributed in a manner such that each fold includes approximately an equal number of validation data from each class.

As previously mentioned above, in a semi-supervised learning scenario, the labels of the newly acquired unlabeled data are approximated. Therefore, there is no guarantee that the approximations are correct because the labels are approximated in a non-deterministic manner. However, the edge learning module 180 (e.g., the edge learning module 180 shown in FIG. 1) takes advantage of the fact that augmented data from the same group should have the same label and the same distribution of the augmented data over the k-folds. Thus, the edge device 150 augments the approximately labeled data and distributes them over the k-folds to ensure a fair representation of the approximated labels in each fold.

In some implementations, the edge learning processing system constructs stratified k-fold differently because the size of k is not the same as $n_a$. FIG. 8 depicts three different situations: (1) a first case of stratification 801 where the size of $n_a$=k, (2) a second case of stratification 803 where the size of $n_a$<k, and (3) a third case of stratification 805 where the size of $n_a$>k. The goal is to ensure that stratification has a good representation of the $n_c$ classes for each fold. In some implementations, a good representation in a subset (i.e., fold) is defined as a validation data distribution that represents the training data. Therefore, the $n_a$ number of augmented data from a source data are distributed in a manner in which each fold includes approximately an equal number of validation data from each class.

As shown in FIG. 8, for the first case of stratification 801, the $n_a$ number of augmented data is evenly distributed over the folds if $n_a$=k. In the second case of stratification 803, if $n_a$<k, then the edge learning process system first distributes the $n_a$ number of augmented data over the folds and the edge learning processing system chooses one of $$\binom{n_a}{k-j}$$

subsets of $\{1, \ldots, n_a\}$ and distributes the subset of augmented data to the remaining folds, i.e. (k−j) folds. For the third case of stratification 805, if $n_a$>k, then the present disclosure first chooses $U_{1 \ldots c}\{u_1, \ldots, u_k\}$, $U_1$, $U_2$, ..., $$U_c \subset \binom{n_a}{k}$$

subsets of $\{1, \ldots, n_a\}$ and the edge learning processing system distributes the chosen augmented data to the k folds. It is noted that the present disclosure attempts to have an equal chance of representation of the $n_c$ classes for each fold in any of these three cases.

Figure 9:
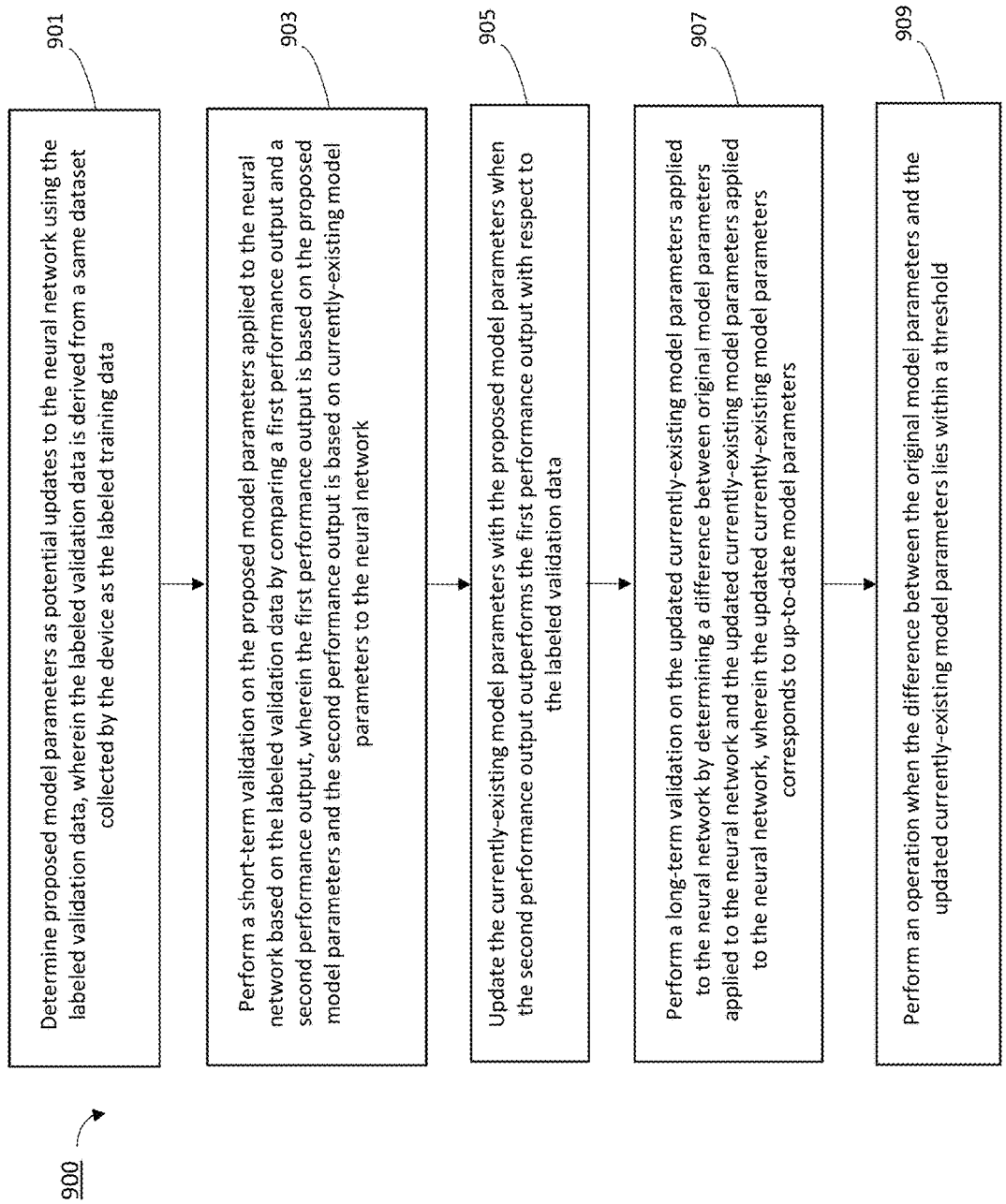
FIG. 9 is a flowchart of validating a performance of a pretrained neural network trained by using automatically-labeled training and validation data that is generated based on data collected by a device in accordance with some implementations.

FIG. 9 is a flowchart of validating a performance of a pretrained neural network trained by using automatically-labeled training and validation data that is generated based on data collected by a device in accordance with some implementations. In various implementations, the method 900 is performed by a device (e.g., the edge device 150 shown in FIG. 1 or the edge device 1100 shown in FIG. 11) with one or more processors and a non-transitory memory. In some implementations, the method 900 is performed by processing logic including hardware, firmware, software, or a combination thereof. In some implementations, the method 900 is performed by a processor executing code stored in a non-transitory computer-readable medium (e.g., a memory).

As represented by block 901, the method 900 includes determining proposed model parameters as potential updates to the neural network using the automatically-labeled validation data, wherein the automatically-labeled validation data is derived from a same dataset collected by the device as the automatically-labeled training data. In some implementations, the edge device 150 (e.g., the edge device 150 shown in FIG. 1) learns the proposed model parameters by performing a forward pass calculation and a backpropagation over the auto-labeled training data.

In some implementations, the automatically-labeled training data is selected from input data that are captured by the sensors (e.g., the sensors 130) connected to the edge device 150 because it is not practical to manually acquire training and validation data when the edge device 150 is deployed to a real-world environment.

As represented by block 903, the method 900 includes performing a short-term validation on the proposed model parameters applied to the neural network based on the labeled validation data by comparing a first performance output and a second performance output, wherein the first performance output is determined from applying the proposed model parameters to the pretrained neural network and the second performance output is determined from applying currently-existing model parameters to the neural network.

As represented by block 905, the method 900 includes updating the currently-existing model parameters with the proposed model parameters when the second performance output outperforms the first performance output with respect to the labeled validation data. The method 900 further includes discarding the labeled training data and the automatically-labeled validation data when the first performance output outperforms the second performance output with respect to the labeled data. The method 900 further includes updating the model parameters by replacing the values of the currently existing model parameters with the new ones when the second performance output outperforms the first performance output with respect to the labeled data. In some implementations, the method 900 further includes saving an instance of the currently-existing model parameters as a previously existing model parameters before updating the currently-existing model parameters with the proposed model parameters. In some implementations, the method 900 further includes transferring the proposed model parameters to a memory (e.g., the memory 160 shown in FIG. 1) to replace the updated currently-existing model parameters, wherein the memory is accessible by a processor.

In some implementations, the updated model parameters are also stored in a database (e.g., memory 160 shown in FIG. 1) for model parameter records. Previous validation measurements with corresponding model parameters in the model parameter records may provide useful information regarding the newly proposed model parameters. For example, a threshold may be adjusted based on a weighted average of the performance by using previous validation measurements with the corresponding model parameters that were used for successful model parameter updates. This also helps in assuring that the performance improvements using the newly proposed model parameters are not trivial.

In some implementations, the short-term validation is formalized as follows:

$y_i^t = M^t(x_i)$, with a set of current model parameters
$P_t = \text{param}(M^t)$ $y_i^{t+1} = M^{t+1}(x_i)$, with a set of proposed model parameters
$P_{t+1} = \text{param}(M^{t+1})$ $P_{t+1}$ passes the short term validation test,
if $(mAP(y_i^{t+1}) - mAP(y_i^t)) > \theta_{sv}$ for $n_{sv}$ number of $x_i \in X^{f=k}$
Save $\text{param}(M^{t+1})$ to a history of model parameters $H^p$, where the terms to this equation are defined as follows:
$x_i$: $i_{th}$ input vector, $x_i \in X^{f=k}$, $X^{f=k} \subset X_s$
$X_s$: a set of sampled input vectors
$X^{f=k}$: $k_{th}$ fold in the set of sampled input vectors $X_s$
$y_i^t$: Softmax output for $i_{th}$ input vector $x_i$ by the current neural network $M^t$
$y_i^{t+1}$: Softmax output for ith input vector $x_i$ by the proposed neural network $M^{t+1}$
$\theta_{sv}$: pre-defined threshold for short term validation
$n_{sv}$: pre-defined number of input vectors that should pass for short term validation In some implementations, the sizes of $n_{sv}$ and k in the k-fold cross validation are predefined during the base model training that occurs on the training server (e.g., the training server 110 shown in FIG. 1).

As explained above, from a global perspective, the series of local validations (e.g., short-term validation) will not guarantee the performance coverage of the neural network in a long run. Therefore, it is necessary to process a longer-term validation process on the neural network after a predefined interval that captures a series of model parameter updates.

As represented by block 907, the method 900 includes performing the long-term validation on the updated currently-existing model parameters applied to the neural network by determining a difference between original model parameters applied to the neural network and the updated currently-existing model parameters applied to the neural network, wherein the updated currently-existing model parameters corresponds to up-to-date model parameters.

In some implementations, the long-term validation is formalized as follows:

Stage 1:
$y_i^o = M^o(x_i)$, with a set of original model parameters $P_{t=0} =)\text{param}(M^o)$, $P_{t=0} \in H^p$
$y_i^t = M^t(x_i)$, with a set of current model parameters $P_t = \text{param}(M^t)$, $P_t \in H^p$
$y_i^{t+1} = M^{t+1}(x_i)$, with a set of proposed model parameters $P_{t+1} = \text{param}(M^{t+1})$ $P_{t+1}$ passes the long term validation stage 1 test,
if $\Sigma_{k+0}^t (mAP(y_i^{k+1}) - mAP(y_i^k)) < \theta_{lv}$ for $n_{lv}$ number of $x_i \in X^{f=k}$ $P_{t+1}$ passes the short term validation stage 1 test,
if $(mAP(y_i^{t+1}) - mAP(y_i^t)) > \theta_{sv}$ for $n_{sv}$ number of $x_i \in X^{f=k}$ where the terms to this equation are defined as follows:
$x_i$: $i_{th}$ input vector, $x_i \in X^{f=k}$, $X^{f=k} \subset X_s$
$X_s$: a set of sampled input vectors
$X^{f=k}$: $k_{th}$ fold in the set of sampled input vectors $X_s$
$y_i^o$: Softmax output for ith input vector $x_i$ by the original neural network $M^t$
$y_i^t$: Softmax output for ith input vector $x_i$ by the current neural network $M^{t+1}$
$y_i^{t+1}$: Softmax output for ith input vector $x_i$ by the proposed neural network $M^{t+1}$
$\theta_{lv}$: pre-defined threshold for long term validation
$\theta_{sv}$: pre-defined threshold for short term validation
$n_{lv}$: pre-defined number of input vectors that should pass for long term validation
$n_{sv}$: pre-defined number of input vectors that should pass for short term validation
$H^p$: a history of model parameters Stage 2:
$y_r^o = M^o(x^r)$, with a set of original model parameters $P_{t=0} =)\text{param}(M^o)$, $P_{t=0} \in H^p$
$y_r^t = M^t(x_r)$, with a set of current model parameters $P_t = \text{param}(M^t)$, $P_t \in H^p$
$y_r^{t+1} = M^{t+1}(x_r)$, with a set of proposed model parameters $P_{t+1} = \text{param}(M^{t+1})$ $P_{t+1}$ passes the long term validation stage 2 test,
if $\Sigma_{k=0}^t (mAP(y_r^{k+1}) - mAP(y_r^k)) < \theta_{iv}$ for $n_{iv}$ number of $x_r \in X_r$ $P_{t+1}$ passes the short term validation stage 2 test,
if $(mAP(y_r^{t+1}) - mAP(y_r^t)) > \theta_{sv}$ for $n_{sv}$ number of $x_r \in X_r$ where the terms to this equation are defined as follows:
$x_r$: rth input vector, $x_r \in X_r$
$X_r$: a set of reference input vectors
$y_r^o$: Softmax output for rth input vector $x_r$ by the original neural network $M^o$
$y_r^t$: Softmax output for rth input vector $x_r$ by the current neural network $M^t$
$y_r^{t+1}$: Softmax output for rth input vector $x_r$ by the proposed neural network $M^{t+1}$ Stage 3:
$P_{t+1}$ passes the long term validation test
if $P_{t+1}$ passes both stage 1 and stage 2 long term validation tests, $P_{t+1}$ passes the short term validation test
if $P_{t+1}$ passes both stage 1 and stage 2 short term validation tests, if $P_{t+1}$ passes both the long term validation test and the short term validation test
Save $\text{param}(M^{t+1})$ to a history of model parameters $H^p$, In some implementations, the sizes of $n_{iv}$, $n_{sv}$ and k in the k-fold cross validation are predefined during the base model training that occurs on the training server (e.g., the training server 110 shown in FIG. 1).

As represented by block 909, the method 900 includes performing an operation when the difference between the original model parameters and the updated currently-existing model parameters lies within a threshold. In some implementations, the method 900 further includes adjusting the updated currently-existing model parameters when the difference between the original model parameters and the updated currently-existing model parameters lies outside the threshold, wherein adjusting the updated currently-existing model parameters further comprises: setting the updated currently-existing model parameters to a previously existing model parameters, performing a factory reset on the updated currently-existing model parameters to the original model parameters, or updating the updated currently-existing model parameters to a new set of model parameters over a network. In some implementations, the threshold or the original model parameters is set through updates over a network 120 (e.g., the network 120 shown in FIG. 1).

In some implementations, wherein the difference between the original model parameters and the updated currently-existing model parameters is determined by comparing a first median average precision related to a first performance of the original parameters applied to the pretrained neural network and a second median average precision related to a second performance of the updated currently-existing model parameters applied to the pretrained neural network.

Figure 10:
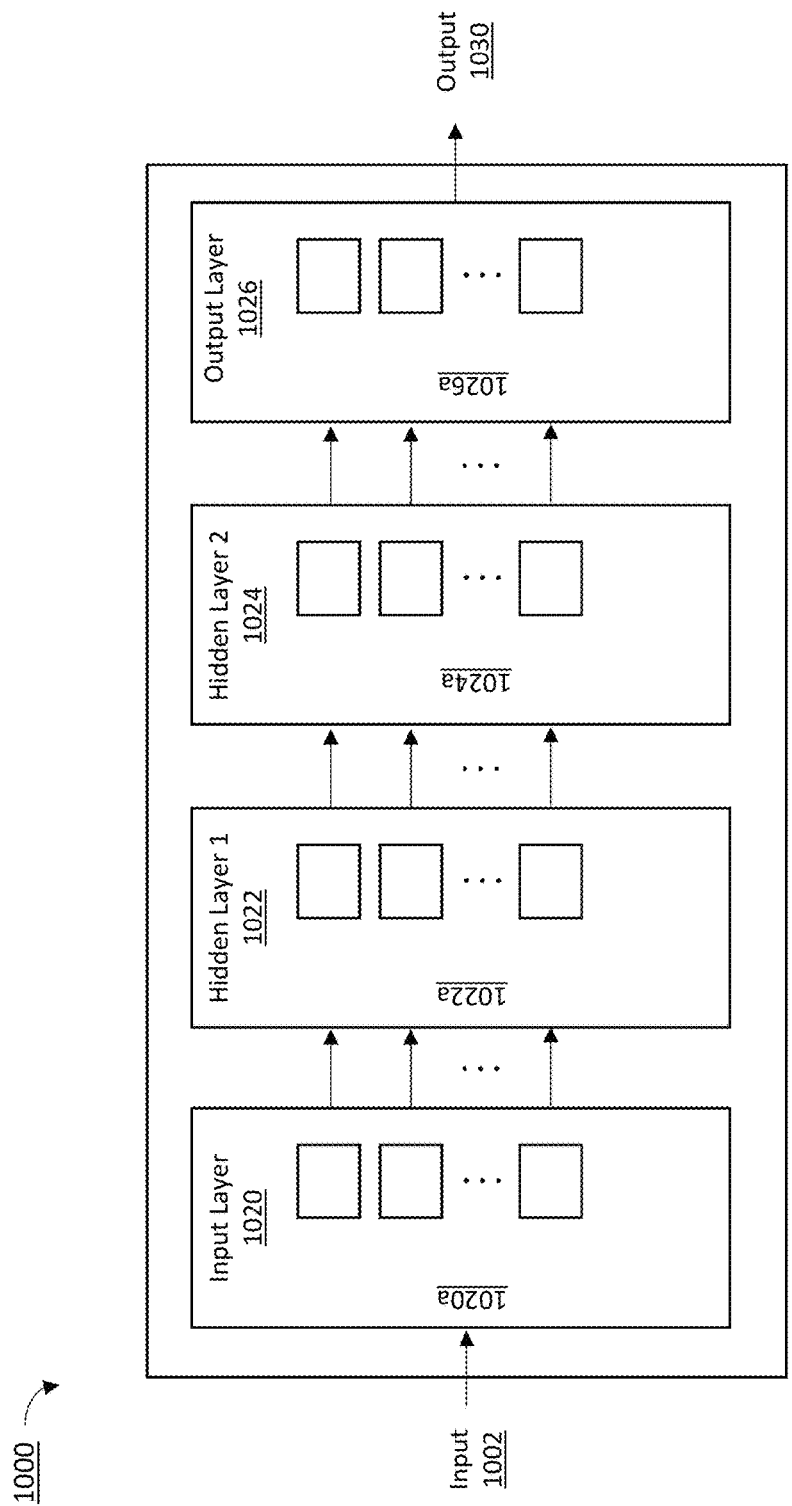
FIG. 10 is a block diagram of an example neural network in accordance with some implementations.

FIG. 10 is a block diagram of an example neural network 1000 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 1000 includes an input layer 1020, a first hidden layer 1022, a second hidden layer 1024, and an output layer 1026. While the neural network 1000 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 1020 is coupled (e.g., configured) to receive various inputs 1002 (e.g., image data). For example, the input layer 1020 receives pixel data from one or more image sensors (e.g., the image sensor 132 shown in FIG. 1). In various implementations, the input layer 1020 includes a number of long short-term memory (LSTM) logic units 1020a, which are also referred to as model(s) of neurons by those of ordinary skill in the art. In some such implementations, an input matrix from the features to the LSTM logic units 1020a include rectangular matrices. For example, the size of this matrix is a function of the number of features included in the feature stream.

In some implementations, the first hidden layer 1022 includes a number of LSTM logic units 1022a. In some implementations, the number of LSTM logic units 1022a ranges between approximately 10-500. Those of ordinary skill in the art will appreciate that, in such implementations, the number of LSTM logic units per layer is orders of magnitude smaller than previously known approaches (being of the order of O(101) to O(102)), which allows such implementations to be embedded in highly resource-constrained devices. As illustrated in the example of FIG. 10, the first hidden layer 1022 receives its inputs from the input layer 1020. For example, the first hidden layer 1022 performs one or more of following: a convolutional operation, a nonlinearity operation, a normalization operation, a pooling operation, and/or the like.

In some implementations, the second hidden layer 1024 includes a number of LSTM logic units 1024a. In some implementations, the number of LSTM logic units 1024a is the same as or similar to the number of LSTM logic units 1020a in the input layer 1020 or the number of LSTM logic units 1022a in the first hidden layer 1022. As illustrated in the example of FIG. 10, the second hidden layer 1024 receives its inputs from the first hidden layer 1022. Additionally and/or alternatively, in some implementations, the second hidden layer 1024 receives its inputs from the input layer 1020. For example, the second hidden layer 1024 performs one or more of following: a convolutional operation, a nonlinearity operation, a normalization operation, a pooling operation, and/or the like.

In some implementations, the output layer 1026 includes a number of LSTM logic units 1026a. In some implementations, the number of LSTM logic units 1026a is the same as or similar to the number of LSTM logic units 1020a in the input layer 1020, the number of LSTM logic units 1022a in the first hidden layer 1022, or the number of LSTM logic units 1024a in the second hidden layer 1024. In some implementations, the output layer 1026 is a task-dependent layer that performs a computer vision related task such as feature extraction, object recognition, object detection, pose estimation, or the like. In some implementations, the output layer 1026 includes an implementation of a multinomial logistic function (e.g., a soft-max function) that produces a number of outputs 1030.

Neural networks, such as CNNs are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

Figure 11:
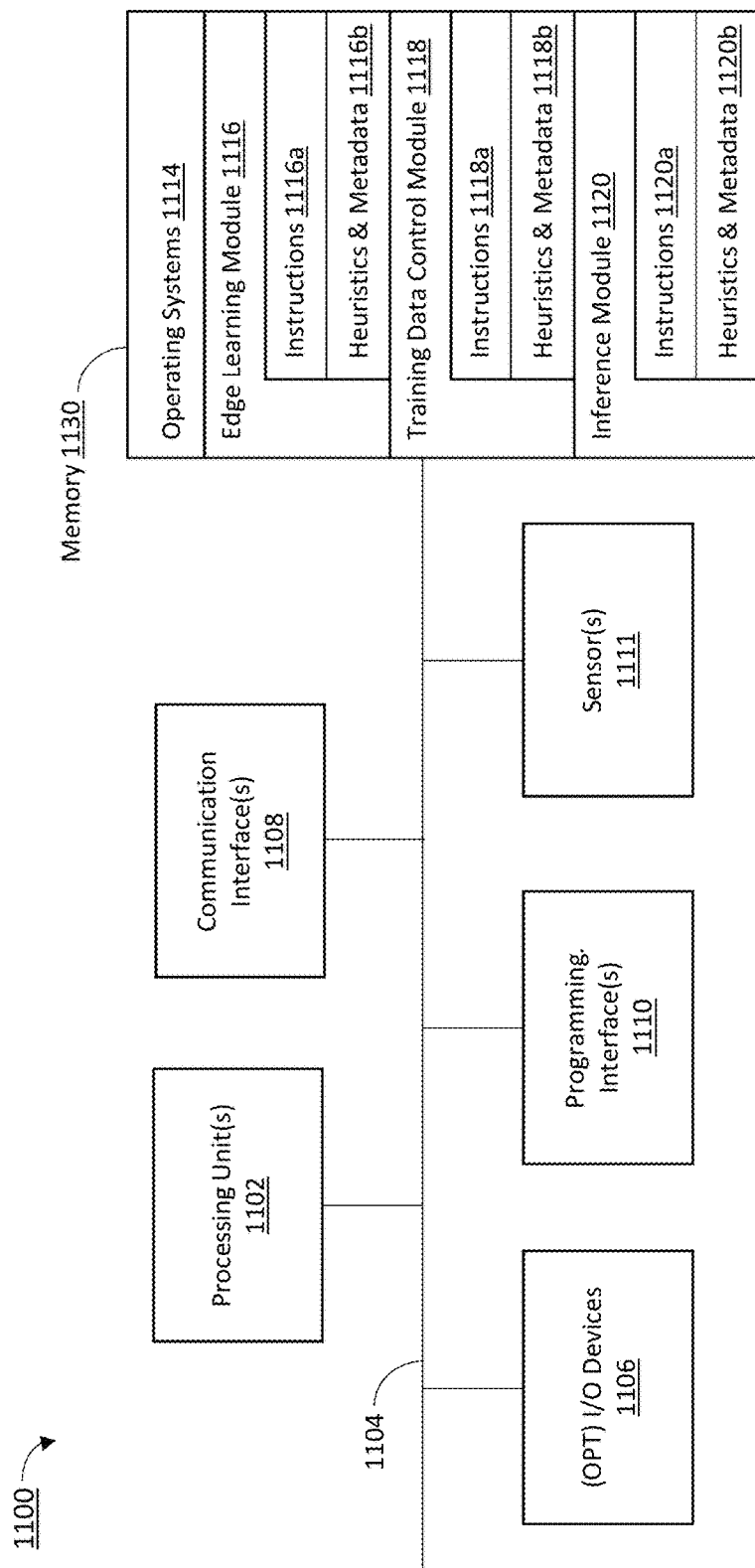
FIG. 11 is a block diagram of an edge device in accordance with some implementations.

FIG. 11 is a block diagram of an example edge device (e.g., the edge device 150 shown in FIG. 1) configured in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., NMP, microprocessors, ASICs, FPGAs, GPUs, CPUs, processing cores, and/or the like), one or more optional I/O devices 1106, one or more communications interfaces 1108 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, and/or the like type interfaces), one or more programming (e.g., I/O) interfaces 1110, one or more sensor(s) 1111, a memory 1130, and one or more communication buses 1104 for interconnecting these and various other components.

In some implementations, the one or more communication buses 1104 include circuitry that interconnects and controls communications between system components.

In some implementations, the sensors 1111 are configured to obtain image data frames. For example, the sensors 1111 correspond to one or more RGB cameras (e.g., with a complementary metal-oxide-semiconductor (CMOS) image sensor, or a charge-coupled device (CCD) image sensor), infrared (IR) image sensors, event-based cameras, a microphone, and/or the like.

The memory 1130 includes high-speed random-access memory, such as DRAM, SRAM, DDR RAM, or other random-access solid-state memory devices. In some implementations, the memory 1130 includes non-volatile memory, such as one or more magnetic disk storage devices, optical disk storage devices, flash memory devices, or other non-volatile solid-state storage devices. The memory 1130 optionally includes one or more storage devices remotely located from the one or more processing units 1102. The memory 1130 comprises a non-transitory computer readable storage medium. In some implementations, the memory 1130 or the non-transitory computer readable storage medium of the memory 1130 stores the following programs, modules and data structures, or a subset thereof including an optional operating system 1114, an edge learning module 1116, a training data control module 1118, and an inference module 1120.

The optional operating system 1114 includes procedures for handling various basic system services and for performing hardware dependent tasks.

In some implementations, the edge learning module 1116 is configured to perform data augmentation, confidence upgrade, auto-labeling the training and validation data, perform short-term and long-term validation, and update the neural network parameters. To that end, in various implementations, the edge learning module 1116 includes instructions 1116a and/or logic therefor, and heuristics and metadata 1116b therefore.

In some implementations, the training data control module 1118 is configured to determine a size of training data and schedule when to initiate the execution of the neural network training for edge learning. To that end, in various implementations, the training data control module 1118 includes instructions 1118a and/or logic therefor, and heuristics and metadata 1118b therefore.

In some implementations, the inference module 1120 is configured to produce inference results for the training and validation data and to perform an inference consistency check in an augmented data group. To that end, in various implementations, the inference module 1120 includes instructions 1120a and/or logic therefor, and heuristics and metadata 1120b therefore.

Although the edge learning module 1116, the training data control module 1118, and the inference module 1120 are shown as residing on a single device (e.g., the edge device 1100), it should be understood that in some implementations, any combination the edge learning module 1116, the training data control module 1118, and the inference module 1120 may be located in separate computing devices.

Moreover, FIG. 11 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first image could be termed a second image, and, similarly, a second image could be termed a first image, which changing the meaning of the description, so long as the occurrences of the "first image" are renamed consistently and the occurrences of the "second image" are renamed consistently. The first image and the second image are both images, but they are not the same image.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method for validating performance of a neural network trained using labeled training and validation data generated based on data collected by a device, the method comprising:
determining proposed model parameters as potential updates to the neural network using the labeled validation data,
wherein the labeled validation data is derived from a same dataset collected by the device as the labeled training data;
performing a short-term validation on the proposed model parameters applied to the neural network based on the labeled validation data by comparing a first performance output and a second performance output,
wherein the first performance output is based on the proposed model parameters and the second performance output is based on currently-existing model parameters applied to the neural network;
updating the currently-existing model parameters with the proposed model parameters when a second median average precision related to the second performance output outperforms a first median average precision related to the first performance output with respect to the labeled validation data,
performing a long-term validation on the updated currently-existing model parameters applied to the neural network by determining a difference between original model parameters applied to the neural network and the updated currently-existing model parameters applied to the neural network,
wherein the updated currently-existing model parameters corresponds to up-to-date model parameters; and
performing an operation when the difference between the original model parameters applied to the neural network and the updated currently-existing model parameters applied to the neural network lies within a threshold.

2. The method of claim 1, further comprising discarding the labeled training data and the labeled validation data when the first performance output outperforms the second performance output with respect to the labeled validation data.

3. The method of claim 1,
wherein performing the operation comprises adjusting the updated currently-existing model parameters when the difference between the original model parameters applied to the neural network and the updated currently-existing model parameters applied to the neural network lies outside the threshold,
wherein adjusting the updated currently-existing model parameters further comprises:
setting the updated currently-existing model parameters to previously existing model parameters,
performing a factory reset on the updated currently-existing model parameters to the original model parameters, or
updating the updated currently-existing model parameters to a new set of model parameters over a network.

4. The method of claim 1,
wherein the labeled validation data is labeled in accordance with a confidence level based on a first confidence condition, a second confidence condition, and a third confidence condition,
wherein the first confidence condition is determined by performing a data consistency check based on generating augmented data from each candidate data from among a subset of candidate data;
wherein the generated augmented data are being used as inputs into the first neural network to determine a first confidence condition for each of the subset of candidate data,
wherein the second confidence condition is determined by inputting the subset of candidate data into a second neural network that is trained using data from an environment,
wherein the second neural network is a version of the neural network overfitted to the environment,
wherein the third confidence condition is determined by performing a clustering on the subset of candidate data, and
wherein results from the clustering on the subset of candidate data are used as inputs into a third machine learning approach to determine a third confidence condition.

5. The method of claim 1, wherein comparing the first performance output and the second performance output is based on performing a stratification of k-folds.

6. The method of claim 1, wherein the difference between original model parameters applied to the neural network and the updated currently-existing model parameters applied to the neural network is determined by comparing a first median average precision related to a first performance of the neural network with the original parameters and a second median average precision related to a second performance of the neural network with the updated currently-existing model parameters.

7. The method of claim 1, wherein the threshold or the original model parameters is set via updates over a network.

8. The method of claim 1, further comprising saving an instance of the currently-existing model parameters as a previously existing model parameter before updating the currently-existing model parameters with the proposed model parameters.

9. The method of claim 1,
wherein updating the currently-existing model parameters with the proposed model parameters further comprises transferring the proposed model parameters to a memory to replace the currently-existing model parameters,
wherein the memory is accessible by a neuromorphic processor.

10. The method of claim 1, wherein the labeled training data and validation data is sampled and augmented before performing the short-term validation and long-term validation.

11. An edge device for validating a performance of a neural network trained using labeled training and validation data generated based on data collected by the edge device, the edge device comprising:
one or more processors;
a non-transitory memory; and
one or more programs stored in the non-transitory memory, which, when executed by the one or more processors, cause the edge device to perform:
determining proposed model parameters as potential updates to the neural network using the labeled validation data,
wherein the labeled validation data is derived from a same dataset collected by the edge device as the labeled training data;

performing a short-term validation on the proposed model parameters applied to the neural network based on the labeled validation data by comparing a first performance output and a second performance output,
wherein the first performance output is based on the proposed model parameters and the second performance output is based on currently-existing model parameters applied to the neural network;
updating the currently-existing model parameters with the proposed model parameters when a second median average precision related to the second performance output outperforms a first median average precision related to the first performance output with respect to the labeled validation data;
performing a long-term validation on the updated currently-existing model parameters applied to the neural network by determining a difference between original model parameters applied to the neural network and the updated currently-existing model parameters applied to the neural network,
wherein the updated currently-existing model parameters corresponds to up-to-date model parameters; and
performing an operation when the difference between the original model parameters applied to the neural network and the updated currently-existing model parameters applied to the neural network lies within a threshold.

12. The edge device of claim 11, wherein the one or more programs, when executed by the one or more processors, further cause the edge device to perform discarding the labeled training data and the labeled validation data when the first performance output outperforms the second performance output with respect to the labeled validation data.

13. The edge device of claim 11,
wherein performing the operation comprises adjusting the updated currently-existing model parameters when the difference between the original model parameters applied to the neural network and the updated currently-existing model parameters applied to the neural network lies outside the threshold,
wherein adjusting the updated currently-existing model parameters further comprises:
setting the updated currently-existing model parameters to a previously existing model parameters,
performing a factory reset on the updated currently-existing model parameters to the original model parameters, or
updating the updated currently-existing model parameters to a new set of model parameters over a network.

14. The edge device of claim 11,
wherein the labeled validation data is labeled in accordance with a confidence level based on a first confidence condition, a second confidence condition, and a third confidence condition,
wherein the first confidence condition is determined by performing a data consistency check based on generating augmented data from each candidate data from among a subset of candidate data;
wherein the generated augmented data are being used as inputs into the neural network to determine a first confidence condition for each of the subset of candidate data,
wherein the second confidence condition is determined by inputting the subset of candidate data into a second neural network that is trained using data from an environment,
wherein the second neural network is a version of the first neural network overfitted to the environment,
wherein the third confidence condition is determined by performing a clustering on the subset of candidate data, and
wherein results from the clustering on the subset of candidate data are used as inputs into a third machine learning approach to determine a third confidence condition.

15. The edge device of claim 11, wherein comparing the first performance output and the second performance output is based on performing a stratification of k-folds.

16. The edge device of claim 11, wherein the difference between original model parameters applied to the neural network and the updated currently-existing model parameters applied to the neural network is determined by comparing a first median average precision related to a first performance of the neural network with the original parameters and a second median average precision related to a second performance of the neural network with the updated currently-existing model parameters.

17. The edge device of claim 11, wherein the threshold or the original model parameters is set via updates over a network.

18. The edge device of claim 11, wherein the one or more programs, when executed by the one or more processors, further cause the edge device to save an instance of the currently-existing model parameters as a previously existing model parameter before updating the currently-existing model parameters with the proposed model parameters.

19. The edge device of claim 11,
wherein updating the currently-existing model parameters with the proposed model parameters further comprises transferring the proposed model parameters to the memory to replace the currently-existing model parameters,
wherein the memory is accessible by a neuromorphic processor.

20. The edge device of claim 11, wherein the labeled training data and validation data is sampled and augmented before performing the short-term validation and long-term validation.

21. A machine-readable non-transitory medium having stored thereon machine-executable instructions for validating performance of a neural network trained using labeled training and validation data generated based on data collected by a device, the instructions comprising:
determining proposed model parameters as potential updates to the neural network using the labeled validation data,
wherein the labeled validation data is derived from a same dataset collected by the device as the labeled training data;
performing a short-term validation on the proposed model parameters applied to the neural network based on the labeled validation data by comparing a first performance output and a second performance output,
wherein the first performance output is based on the proposed model parameters and the second performance output is based on currently-existing model parameters applied to the neural network;
updating the currently-existing model parameters with the proposed model parameters when a second median average precision related to the second performance output outperforms a first median average precision related to the first performance output with respect to the labeled validation data, performing a long-term validation on the updated currently-existing model parameters applied to the neural network by determining a difference between original model parameters applied to the neural network and the updated currently-existing model parameters applied to the neural network,
wherein the updated currently-existing model parameters corresponds to up-to-date model parameters; and
performing an operation when the difference between the original model parameters applied to the neural network and the updated currently-existing model parameters applied to the neural network lies within a threshold.

* * * * *